United States Patent
Yan

(10) Patent No.: US 7,962,153 B2
(45) Date of Patent: *Jun. 14, 2011

(54) METHOD AND SYSTEM FOR SECURE USER PLANE LOCATION

(75) Inventor: Xiaolu Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 926 days.

This patent is subject to a terminal disclaimer.

(21) Appl. No.: 11/828,089

(22) Filed: Jul. 25, 2007

(65) Prior Publication Data

US 2008/0045237 A1 Feb. 21, 2008

Related U.S. Application Data

(63) Continuation of application No. PCT/CN2006/001847, filed on Jul. 25, 2006.

(30) Foreign Application Priority Data

Jul. 25, 2005 (CN) .......................... 2005 1 0085550
Sep. 21, 2005 (CN) .......................... 2005 1 0103576

(51) Int. Cl.
*H04Q 1/00* (2006.01)

(52) U.S. Cl. .................. 455/456.1; 455/456.2; 455/433; 455/435.1

(58) Field of Classification Search ............... 455/456.1, 455/456.2, 456.3, 456.4, 456.5, 404.1, 404.2, 455/412.1, 412.2, 414.1, 414.2

See application file for complete search history.

(56) References Cited

U.S. PATENT DOCUMENTS

| 6,360,102 B1 | 3/2002 | Havinis et al. |
| 2001/0044309 A1 | 11/2001 | Bar et al. |

(Continued)

FOREIGN PATENT DOCUMENTS

CN 1582046 A 2/2005

(Continued)

OTHER PUBLICATIONS

"Digital Cellular Telecommunications System (Phase 2+); Universal Mobile Telecommunications System (Umts); Functional Stage 2 Description of Location Services (LCS) (3GPP Ts 23.271 version 6.12.0 Release 6);" *ETSI Standards*, 3-SA2(V6.12.0): 1-121 (Jun. 1, 2005).

"OMA-AD-SUPL-V1 0-20050719-C: Secure User Plane Location Architecture V1.0," *Annoucement Open Mobile Alliance*, cand.(version 1.0): 1-80 (Jul. 19, 2005).

Written Opinion in PCT Application No. PCT/CN2006/001847, mailed Nov. 16, 2006.

Communication in European Application No. 06761577.3-2412, mailed Aug. 5, 2010.

"UserPlane Location Protocol," *Open Mobile Alliance Ltd.*, Draft Version 1.0, OMA-TS-ULP-V1_0-20050414-D, Apr. 14, 2005.

(Continued)

*Primary Examiner* — Jean A Gelin
(74) *Attorney, Agent, or Firm* — Leydig, Voit & Mayer, Ltd.

(57) ABSTRACT

A method of Secure User Plane Location includes: receiving, by a home SUPL Location Platform (H-SLP) of a target SUPL Enabled Terminal (target SET), a positioning request of the target SET from an SUPL Agent; positioning, by the H-SLP, the target SET and obtaining a position estimate of the target SET; sending, by the H-SLP, a location notification message carrying the position estimate of the target SET to a third party client based on information of the third party client obtained. Embodiments of the present invention also disclose an SUPL system including: an SUPL Agent, an H-SLP and a third party client. The technical solutions in accordance with the embodiments of the present invention meet the demand of informing the third party client of the position estimate of the target SET and further extend the application scope of the SUPL protocol.

12 Claims, 14 Drawing Sheets

U.S. PATENT DOCUMENTS

| | | | |
|---|---|---|---|
| 2004/0192337 A1* | 9/2004 | Hines et al. | 455/456.1 |
| 2005/0118999 A1 | 6/2005 | Zhu | |
| 2005/0250516 A1* | 11/2005 | Shim | 455/456.1 |
| 2006/0245406 A1* | 11/2006 | Shim | 370/338 |
| 2006/0246919 A1* | 11/2006 | Park et al. | 455/456.1 |
| 2007/0004429 A1* | 1/2007 | Edge et al. | 455/456.1 |
| 2009/0036142 A1* | 2/2009 | Yan | 455/456.1 |

FOREIGN PATENT DOCUMENTS

| | | |
|---|---|---|
| CN | 1582047 A | 2/2005 |
| CN | 1852569 A | 10/2005 |
| CN | 100442924 C | 12/2008 |
| CN | 100450297 C | 1/2009 |
| KR | 2005-0109899 B1 | 11/2005 |
| WO | WO 2005/057884 A2 | 6/2005 |

OTHER PUBLICATIONS

"UserPlane Location Protocol," *Open Mobile Alliance Ltd.*, Draft Version 1.0, OMA-TS-ULP-V1_0-20050315-D, Mar. 15, 2005 (with track changes indicated).

"UserPlane Location Protocol," *Open Mobile Alliance Ltd.*, Draft Version 1.0, OMA-TS-ULP-V1_0-20050315-D, Mar. 15, 2005.

* cited by examiner

METHOD AND SYSTEM FOR SECURE USER PLANE LOCATION

This application is a continuation of International Patent Application No. PCT/CN2006/001847, filed Jul. 25, 2006, which claims priority to Chinese Patent Application Nos. 200510103576.1, filed Sep. 21, 2001, and 200510085550.9, filed Jul. 25, 2005, all of which are hereby incorporated by reference.

FIELD OF THE TECHNOLOGY

The present invention relates to location service technologies, and particularly, to a method and a system for Secure User Plane Location (SUPL).

BACKGROUND OF THE INVENTION

The Open Mobile Alliance (OMA) has provided a set of SUPL protocols to comprehensively standardize SUPL services. The SUPL protocols provide accurate location for an SUPL Enabled Terminal (SET) with an assisted-Global Positioning System (AGPS) ability without any re-construction to devices of an existing network, and define an SET-initiated positioning procedure, a network-initiated positioning procedure and message interfaces in the positioning procedures. In the SET-initiated positioning procedure, the SET initiatively sends a positioning request to an SUPL Location Platform (SLP) and obtains accurate location of the SET through subsequent positioning procedure adopting positioning technologies such as AGPS. In the network-initiated positioning procedure, a Mobile Location Service (MLS) application at the network side sends a positioning request of a client to the SLP through an SUPL Agent, and obtains the accurate location of the target SET through subsequent SUPL positioning procedure adopting positioning technologies such as AGPS.

FIG. 1 is a message flow of an SET-initiated SUPL procedure with Home-SLP (H-SLP) positioning according to the related art, mainly includes the following blocks.

Block 101: Upon the receipt of a positioning request from an application running on the target SET, an SUPL Agent on the target SET sends an SUPL START message to the H-SLP of the target SET to start a positioning session with the H-SLP.

If the target SET is not already attached to a Packet Data Network (PDN) when the positioning request is sent, the target SET attaches itself to the PDN or establishes a circuit switched data connection to attach itself to the PDN through the circuit switched data connection.

The SUPL Agent may use a default address provisioned by a home network of the target SET to establish a secure IP connection to the H-SLP.

The SUPL START message includes session id, location identifier (lid) and SET capabilities. The lid is a location identifier identifying a cell of the target SET and used to describe a coarse position of the target SET. The SET capabilities include posmethod(s) supported by the target SET (e.g., target SET-Assisted A-GPS, target SET-Based AGPS) and associated positioning protocols (e.g., Radio Resource Location service Protocol (RRLP), Radio Resource Control (RRC) and Telecommunication Industries Association (TIA)-801).

All messages sent to or received by the target SET are forwarded by the SUPL Agent.

If the H-SLP includes a Home-SUPL Location Centre (H-SLC) and a Home-SUPL Positioning Centre (H-SPC), the H-SLP in this block specifically refers to the H-SLC.

Block 102: The H-SLP verifies whether a previously computed position estimate of the target SET stored by the H-SLP meets a requested Quality of Position (QoP). If the previously computed position estimate of the target SET meets the requested QoP, proceed to Block 110; otherwise, proceed to Block 103.

The QoP may include required positioning accuracy, response time and maximum location age. For example, supposing that the maximum location age of the position estimate of the target SET stored by the H-SLP is 120 seconds, then a position estimate of the target SET obtained 120 seconds ago cannot be used as a current position estimate of the target SET.

If the H-SLP includes an H-SLC and an H-SPC, the H-SLP in this block specifically refers to the H-SLC.

Block 103: The H-SLP verifies whether the target SET is currently roaming. If the target SET is currently roaming, proceed to Block 104; otherwise, proceed to Block 106.

If the H-SLP includes an H-SLC and an H-SPC, the H-SLP in this block specifically refers to the H-SLC.

Block 104: The H-SLP sends a Standard SUPL Roaming Location Immediate Request (SSRLIR) message carrying the lid which is contained in the SUPL START message to a Visitor-SLP (V-SLP) where the target SET is currently roaming, to notify the V-SLP to convert the lid into a requested position estimate, e.g., longitude and latitude.

If the H-SLP includes an H-SLC and an H-SPC, the H-SLP in this block specifically refers to the H-SLC; if the V-SLP includes a V-SLC and a V-SPC, the V-SLP in this block specifically refers to the V-SLC.

Block 105: The V-SLP sends a Standard SUPL Roaming Location Immediate Answer (SSRLIA) message carrying the position estimate of the target SET corresponding to the lid to the H-SLP.

The position estimate of the target SET corresponding to the lid is a coarse position of the target SET.

If the H-SLP includes an H-SLC and an H-SPC, the H-SLP in this block specifically refers to the H-SLC; if the V-SLP includes a V-SLC and a V-SPC, the V-SLP in this block specifically refers to the V-SLC.

Block 106: The H-SLP verifies whether the position estimate of the target SET corresponding to the lid contained in the SUPL START message meets the requested QoP. If the position estimate of the target SET corresponding to the lid contained in the SUPL START message meets the requested QoP, proceed to Block 110; otherwise, proceed to Block 107.

If the H-SLP includes an H-SLC and an H-SPC, the H-SLP in this block specifically refers to the H-SLC.

Block 107: The H-SLP returns an SUPL RESPONSE message to the target SET.

The SUPL RESPONSE message includes the session id but no H-SLP address, to indicate to the target SET that a new connection shall not be established.

The SUPL RESPONSE message further includes the posmethod(s) supported by the H-SLP, the posmethod(s) supported by the H-SLP is (are) determined by the H-SLP according to the posmethod(s) contained in the SUPL START message.

If the H-SLP includes an H-SLC and an H-SPC, the H-SLP that returns the SUPL RESPONSE message to the target SET in this block specifically refers to the H-SLC, the posmethod(s) supported by the H-SLP contained in the SUPL RESPONSE message specifically refers to the posmethod(s) supported by the H-SPC, and the SUPL RESPONSE message further carries the address of the H-SPC.

Block 108: After receiving the SUPL RESPONSE message from the H-SLP, the target SET sends an SUPL POS INIT message to the H-SLP.

The SUPL POS INIT message includes at least session id, lid and target SET capabilities. The target SET capabilities include the posmethod(s) supported by the target SET, e.g., target SET-Assisted A-GPS, target SET-Based AGPS, and associated positioning protocols, e.g., RRLP, RRC, TIA-801.

The target SET may provide Network Measurement Report (NMR) specific for the radio technology being used, e.g., for GSM: Time Advance (TA), Received signal LEVeL (RXLEV).

The target SET may also provide its position estimate, if supported by both the target SET and the H-SLP, to the H-SLP. The position estimate provided by the target SET is previously computed or obtained by the target SET and stored by the target SET. The H-SLP may use the position estimate provided by the target SET as a reference, or may not consider the position estimate.

The target SET may also include a first SUPL POS element in the SUPL POS INIT message, and may also set a Requested Assistance Data element in the SUPL POS INIT message to indicate assistance data needed by the target SET in the SUPL positioning procedure.

If the H-SLP includes an H-SLC and an H-SPC, the H-SLP in this block specifically refers to the H-SPC.

Block 109: The H-SLP determines a posmethod that will be adopted eventually according to the posmethod(s) supported by the target SET contained in the SUPL POS INIT message, and starts the SUPL positioning procedure. After the positioning procedure, the H-SLP obtains the position estimate of the target SET.

The posmethod determined by the H-SLP is supported by both the H-SLP and the target SET.

In the SUPL positioning procedure, the target SET and the H-SLP may exchange several successively positioning procedure messages. The H-SLP may calculate the position estimate of the target SET based on positioning measurements, e.g., target SET-Assisted A-GPS, or the target SET calculates the position estimate based on assistance data obtained from the H-SLP, e.g., target SET-Based A-GPS.

If the H-SLP includes an H-SLC and an H-SPC, the H-SLP in this block specifically refers to the H-SPC.

Block 110: The H-SLP sends an SUPL END message to the target SET, to notify to the target SET that the positioning session is finished.

If the H-SLP needs to return the previous computed position estimate of the target SET stored by the H-SLP to the target SET, or return the coarse position of the target SET obtained based on the lid in the SUP START message to the target SET, the H-SLP carries the position estimate or the coarse position in the SUPL END message. If an SUPL positioning procedure has been performed, the H-SLP determines whether to carry the position estimate of the target SET in the SUPL END message according to the posmethod and positioning protocol adopted. While sending the SUPL END message, the H-SLP releases the secure IP connection and resources related to this positioning session. The target SET also releases resources related to this positioning session after receiving the SUPL END message.

If the H-SLP includes an H-SLC and an H-SPC, the H-SLP in this block specifically refers to the H-SPC.

FIG. 1 is a message flow of a target SET-initiated SUPL positioning procedure with H-SLP positioning. In case that the target SET is roaming, the SUPL positioning procedure may also be implemented by the V-SLP where the target SET is roaming cooperating with the target SET. FIG. 2 is a message flow of a target SET-initiated roaming case with V-SLP positioning according to the related art. As shown in FIG. 2, it includes the following blocks.

Block 201 is similar to Block 101.

Block 202: The H-SLP verifies whether a previously computed position estimate of the target SET stored by the H-SLP meets the requested QoP. If the previously computed position estimate of the target SET meets the requested QoP, proceed to Block 212; otherwise, proceed to Block 203.

Block 203: The H-SLP verifies that the target SET is currently roaming.

Block 204: The H-SLP sends an SSRLIR message carrying the lid that is contained in the SUPL START message to the V-SLP where the target SET is roaming to notify the V-SLP to convert the lid into a requested position estimate, e.g., longitude and latitude.

Specifically, the SSRLIR message carries all the contents contained in the SUPL START message.

Block 205: The V-SLP verifies whether the position estimate of the target SET corresponding to the lid contained in the SUPL START message meets the requested QoP. If the position estimate of the target SET corresponding to the lid contains in the SUPL START message meets the requested QoP, the V-SLP returns an SSRLIA message tunneling an SUPL END message to the H-SLP, and proceed to Block 212; otherwise, proceed to Block 206.

The SUPL END message includes the position estimate of the target SET.

The V-SLP will also verify, after receiving the SSRLIR message, whether the V-SLP supports the positioning.

Block 206: The V-SLP returns an SSRLIA message tunneling an SUPL RESPONSE message to H-SLP.

The SUPL RESPONSE message includes at least session id and posmethod(s) supported by the V-SLP. The posmethod(s) supported by the V-SLP is (are) determined by the V-SLP based on the posmethod(s) contained in the SUPL START message in the SSRLIR message.

Block 207: the H-SLP forwards the SUPL RESPONSE message to the target SET after receiving the SSRLIA message.

The SUPL RESPONSE message includes session id and the posmethod(s) supported by the V-SLP, etc.

Block 208: The target SET sends an SUPL POS INIT message to the H-SLP after receiving the SUPL RESPONSE message.

The SUPL POS INIT message includes at least session id, lid and target SET capabilities. The target SET capabilities include the posmethod(s) supported by the target SET, etc.

Block 209: The H-SLP forwards the SUPL POS INIT message to the V-SLP after receiving the SUPL POS INIT message.

Block 210: The V-SLP determines the posmethod that will be adopted eventually according to the posmethod(s) supported by the target SET contained in the SUPL POS INIT message, and starts the SUPL positioning procedure. After the positioning procedure, the V-SLP obtains the position estimate of the target SET.

The posmethod determined by the V-SLP is supported by both the V-SLP and the target SET.

In the SUPL positioning procedure, the target SET and the V-SLP may exchange several successive positioning procedure messages which are forwarded by the H-SLP. The V-SLP calculates the position estimate based on the positioning measurements received from the target SET, e.g., target SET-Assisted A-GPS, or calculates the position estimate based on assistance data obtained from the V-SLP, e.g., target SET-based A-GPS.

Block 211: The V-SLP sends the position estimate of the target SET to the H-SLP and releases resources related to the positioning session.

Block 212 is similar to Block 110.

In practical applications, the V-SLP may include a V-SLC and a V-SPC. Specifically, the SUPL positioning procedure may be implemented by the V-SPC cooperating with the target SET after a target SET is roaming. FIG. 3 is a message flow of a target SET-initiated roaming case with V-SPC positioning. As shown in FIG. 3, the detailed blocks are given as follows.

Block 301 is similar to Block 101.

Block 302: The H-SLP verifies whether a previously computed position estimate of the target SET stored by the H-SLP meets the requested QoP. If the previously computed position estimate of the target SET meets the requested QoP, the H-SLP sends an SUPL END message carrying the position estimate of the target SET to the target SET and ends the procedure; otherwise, proceed to Block 303.

Block 303: The H-SLP detects that the target SET is currently roaming.

Block 304: The H-SLP sends an SSRLIR message carrying the lid that is contained in the SUPL START message to the V-SLC where the target SET is currently roaming to notify the V-SLC to convert the lid into a requested position estimate, e.g., longitude and latitude.

Specifically, the SSRLIR message carries all the contents contained in the SUPL START message.

Block 305: The V-SLC verifies whether the position estimate of the target SET corresponding to the lid contained in the SUPL START message meets the requested QoP. If the position estimate of the target SET corresponding to the lid contained in the SUPL START message meets the requested QoP, proceed to Block 311; otherwise, proceed to Block 306.

The V-SLP will also verify, after receiving the SSRLIR message, whether it supports the positioning.

Block 306: The V-SLC returns an SSRLIA message tunneling an SUPL RESPONSE message to H-SLP.

The SUPL RESPONSE message includes at least session id, posmethod(s) supported by the V-SPC and the address of the V-SPC. The posmethod(s) supported by the V-SPC is determined by the V-SPC based on the posmethod(s) contained in the SUPL START message in the SSRLIR message.

Block 307: The H-SLP forwards the SUPL RESPONSE message to the target SET after receiving the SSRLIA message.

The SUPL RESPONSE message includes session id, the posmethod(s) supported by the V-SPC, the address of the V-SPC, etc.

Block 308: The target SET sends an SUPL POS INIT message to the V-SPC after receiving the SUPL RESPONSE message.

Block 309: The V-SPC determines the posmethod that will be adopted eventually according to the posmethod(s) supported by the target SET contained in the SUPL POS INIT message and starts the SUPL positioning procedure. After the positioning procedure, the V-SPC obtains the position estimate of the target SET.

The posmethod determined by the V-SPC is supported by both the V-SPC and the target SET.

In the SUPL positioning procedure, the target SET and the V-SPC may exchange several successive positioning procedure messages. The V-SPC may calculate the position estimate of the target SET based on the received positioning measurements, e.g., the target SET-Assisted A-GPS, or the target SET may calculate the position estimate based on the assistance obtained from the V-SPC, e.g., target SET-Based A-GPS.

Block 310: After the SUPL positioning procedure, the V-SPC sends the position estimate of the target SET to the H-SLP through the V-SLC.

Block 311 is similar to Block 110 and the "H-SLP" in Block 110 should be replaced by "V-SPC".

FIG. 1-FIG. 3 are message flows of target SET-initiated SUPL positioning procedures. A network-initiated SUPL procedure will be hereinafter described.

FIG. 4 is a message flow of a network-initiated SUPL case with H-SLP positioning. As shown in FIG. 4, it mainly includes the following blocks.

Block 401: An SUPL Agent at the network side, associated with the H-SLP of the target SET, issues a Mobile Location Protocol (MLP) Standard Location Immediate Request (SLIR) message carrying a client-id of a client and a ms-id of the target SET to the H-SLP.

The client in the positioning includes entities such as SET, Service Provider (SP), etc.

If the H-SLP includes an H-SLC and an H-SPC, the H-SLP in this block specifically refers to the H-SLC.

Block 402: The H-SLP verifies, after receiving the MLP SLIR message, whether a previously computed position estimate of the target SET stored by the H-SLP meets the requested QoP. If the previously computed position estimate of the target SET stored by the H-SLP meets the requested QoP, proceed to Block 403; otherwise, proceed to Block 408.

In this block, after receiving the MLP SLIR message, the H-SLP shall authenticate the SUPL Agent and check, based on the client-id received, whether the SUPL Agent is authorized for the service it requests. Further, based on the ms-id received, the H-SLP shall apply subscriber privacy against the client-id.

If the H-SLP includes an H-SLC and an H-SPC, the H-SLP in this block specifically refers to the H-SLC.

Block 403: The H-SLP verifies whether privacy information of the target SET includes information requiring notification and/or verification by the target SET in the positioning procedure. If the privacy information of the target SET includes information requiring notification and/or verification by the target SET in the positioning procedure, proceed to Block 404; otherwise, proceed to Block 417.

The privacy information of the target SET is stored in a Privacy Checking Entity (PCE). The H-SLP needs to obtain the privacy information of the target SET from the PCE first, and search the privacy information for the information that requires notification and/or verification by the target SET in the positioning procedure.

If the H-SLP includes an H-SLC and an H-SPC, the H-SLP in this block specifically refers to the H-SLC.

Block 404: The H-SLP verifies whether the target SET is currently roaming.

In this block, the H-SLP may also verify whether the target SET supports the SUPL protocol. If the target SET supports the SUPL protocol, proceed to Block 405; otherwise, the H-SLP directly returns an MLP Standard Location Immediate Answer (SLIA) message carrying positioning failure information to the SUPL Agent and ends the procedure.

If the H-SLP includes an H-SLC and an H-SPC, the H-SLP in this block specifically refers to the H-SLC.

Block 405: The H-SLP sends an SUPL INIT message which carries a Notification element and a posmethod element with value of "no position" to the target SET. The Notification element is used for determining a manner that the target SET returns a verification result.

The SUPL INIT message includes session id and may also include the QoP, the address of the H-SLP, a Key Id and a Message Authentication Code (MAC).

For security, the H-SLP calculates a Hash of the SUPL INIT message according to an algorithm defined by the SUPL protocol before sending the SUPL INIT message, and carries the Hash in a verification field element of the SUPL INIT message to send to the target SET. Likewise, the target SET calculates the Hash of the SUPL INIT message according to the algorithm defined by the SUPL protocol after receiving the SUPL INIT message, and verifies if the Hash calculated by the target SET matches that sent by the H-SLP. If the Hash calculated by the target SET matches that sent by the H-SLP, the target SET accepts the SUPL INIT message; otherwise, the target SET neglects the SUPL INIT message. After a timer waiting for an SUPL INIT response expires, the H-SLP sends an MLP SLIA message carrying a positioning failure element to the SUPL Agent.

The SUPL INIT message may be a Wireless Application Protocol (WAP) PUSH or a Short Message Service (SMS) trigger.

If the H-SLP includes an H-SLC and an H-SPC, the H-SLP in this block specifically refers to the H-SLC.

Block 406: After receiving the SUPL INIT message, the target SET sends an SUPL END message to the H-SLP according to the Notification element carried in the SUPL INIT message.

If the Notification element requires the target SET to verify the positioning procedure, the SUPL END message should carry a verification result, i.e., access granted or access denied.

If a Key Id and a MAC is present in the received SUPL INIT message, the target SET may use the Key Id and the MAC to determine whether the SUPL INIT message is authentic. If the SUPL INIT message is authentic, the target SET processes the SUPL INIT message; otherwise, the target SET neglects the SUPL INIT message. After the timer waiting for the SUPL INIT response expires, the H-SLP returns an MLP SLIA message carrying a positioning failure element to the SUPL Agent and ends the procedure.

If the target SET is not already attached to the PDN when receiving the SUPL INIT message, the target SET will attach itself to the PDN or establish a circuit switched data connection so as to attach itself to the PDN through the circuit switched data connection.

Generally, the target SET may use the address of the H-SLP provisioned by the home network of the H-SLP, or the address of the H-SLP carried in the SUPL INIT message, to establish a secure IP connection to the H-SLP. If the SUPL INIT message does not carry the address of the H-SLP, the target SET uses the default address of the H-SLP configured by the target SET to establish a secure IP connection to the H-SLP.

If the H-SLP includes an H-SLC and an H-SPC, the H-SLP in this block specifically refers to the H-SLC.

Block 407: After receiving the SUPL END message, the H-SLP verifies whether the SUPL END message carries the access denied element. If the SUPL END message carries the access denied element, the H-SLP sends an MLP SLIA message carrying a positioning failure element to the SUPL Agent and ends the procedure; otherwise, the H-SLP sends an MLP SLIA message carrying the position estimate of the target SET and end the procedure.

If the H-SLP includes an H-SLC and an H-SPC, the H-SLP in this block specifically refers to the H-SLC.

Block 408: The H-SLP verifies whether the target SET is currently roaming and stores the verification result.

In this block, the H-SLP may also verify whether the target SET supports the SUPL protocol. If the target SET supports the SUPL protocol, proceed to Block 409; otherwise, the H-SLP directly returns an MLP SLIA message carrying the positioning failure element to the SUPL Agent and ends the procedure.

If the H-SLP includes an H-SLC and an H-SPC, the H-SLP in this block specifically refers to the H-SLC.

Block 409: The H-SLP sends an SUPL INIT message carrying the client-id to the target SET.

The SUPL INIT message includes session id and pos-method element, and may also include the QoP, the address of the H-SLP, a Key Id and a MAC.

If the privacy information of the target SET indicates that notification and/or verification by the target SET in the positioning procedure are/is required, the SUPL INIT message shall also carry a Notification element used for determining a manner that the target SET returns the verification result.

If the H-SLP includes an H-SLC and an H-SPC, the H-SLP that returns the SUPL INIT message to the target SET in this block specifically refers to the H-SLC, and the address of the H-SLP contained in the SUPL INIT message specifically refers to the address of the H-SPC.

Block 410: After receiving the SUPL INIT message, the target SET verifies whether the SUPL INIT message carries a Notification element. If the SUPL INIT message carries a Notification element, proceed to Block 411; otherwise, proceed to Block 413.

Block 411: The target SET verifies, according to the client-id contained in the SUPL INIT message, whether the target SET allows to be positioned. If the target SET allows to be positioned, proceed to Block 413; otherwise, proceed to Block 412.

Block 412: The target SET returns an SUPL END message carrying positioning denied information to the H-SLP, and the H-SLP returns an MLP SLIA message carrying a positioning failure element to the SUPL Agent after receiving the SUPL INIT message and ends the procedure.

If the H-SLP includes an H-SLC and an H-SPC, the H-SLP in this block specifically refers to the H-SLC.

Block 413: The target SET sends an SUPL POS INIT message to the H-SLP.

The SUPL POS INIT message in this block is similar to that in Block 108 shown in FIG. 1.

If the H-SLP includes an H-SLC and an H-SPC, the H-SLP in this block specifically refers to the H-SPC.

Block 414: The H-SLP verifies, after receiving the SUPL POS INIT message, whether the position estimate of the target SET corresponding to the lid contained in the SUPL POS INIT message meets the requested QoP. If the position estimate of the target SET corresponding to the lid contained in the SUPL POS INIT message meets the requested QoP, proceed to Block 416; otherwise, proceed to Block 415.

If the target SET is currently roaming, the H-SLP sends the lid contained in the SUPL POS INIT message to the V-SLP through a Standard SUPL Roaming Position (SSRP) message after receiving the SUPL POS INIT message. The V-SLP converts the lid into a requested position estimate of the target SET and sends the position estimate to the target SET through an SSRP message. If the target SET is not currently roaming, it is the H-SLP that converts the lid into the location of the target SET.

If the H-SLP includes an H-SLC and an H-SPC, the H-SLP in this block specifically refers to the H-SPC. If the V-SLP includes a V-SLC and a V-SPC, the V-SLP in this block specifically refers to the V-SLC.

Block 415: The H-SLP determines the posmethod that will be adopted eventually according to the posmethod(s) supported by the target SET contained in the SUPL POS INIT message and starts the SUPL positioning procedure. After the positioning procedure, the H-SLP obtains the position estimate of the target SET.

If the H-SLP includes an H-SLC and an H-SPC, the H-SLP in this block specifically refers to the H-SPC.

As can be seen from the above, this block is similar to Block 109 shown in FIG. 1.

Block 416: The H-SLP sends an SUPL END message to the target SET.

If the position estimate of the target SET corresponding to the lid contained in the SUPL POS INIT message meets the requested QoP, the H-SLP carries the position estimate of the target SET in the SUPL END message. If the H-SLP has performed an SUPL positioning procedure, the H-SLP determines whether to carry the position estimate of the target SET in the SUPL END message according to the posmethod and positioning protocol adopted. After receiving the SUPL END message, the target SET releases resources related to this positioning session.

If the H-SLP includes an H-SLC and an H-SPC, the H-SLP in this block specifically refers to the H-SPC.

Block 417: The H-SLP sends an MLP SLIA message carrying the position estimate of the target SET to the SUPL Agent.

The position estimate carried in the MLP SLIA message is previously calculated by the H-SLP, or is corresponding to the lid carried in the SUPL POS INIT message, or is obtained in the SUPL positioning procedure.

The H-SLP releases resources related to this positioning session when sending the MLP SLIA message.

If the H-SLP includes an H-SLC and an H-SPC, the H-SLP in this block specifically refers to the H-SPC.

FIG. 4 is a message flow of a network-initiated SUPL case with H-SLP positioning. Similar to the target SET-initiated roaming case, the network-initiated SUPL positioning procedure may also be implemented by the V-SLP where the target SET is roaming cooperating with the target SET. FIG. 5 is a message flow of a network-initiated roaming case with V-SLP positioning. As shown in FIG. 5, the detailed blocks are given as follows.

Block 501 is similar to Block 401.

Block 502 is similar to Block 402, "proceed to Block 403; otherwise, proceed to Block 408" in Block 402 should be replaced by "proceed to Block 503; otherwise, proceed to Block 508".

Block 503 is similar to Block 403, and "proceed to Block 404; otherwise, proceed to Block 417" in Block 403 should be replaced by "proceed to Block 504; otherwise, proceed to Block 517".

Block 504 is similar to Block 404, and the difference is that if the H-SLP verifies that the target SET supports the SUPL protocol, proceed to Block 505.

Blocks 505-507 are similar to Blocks 405-407.

Block 508: The H-SLP verifies whether the target SET is currently roaming and stores the verification result, sends the session id, a mobile subscriber identifier (msid) and the QoP to the V-SLP where the target SET is roaming through an SSRLIR message. After receiving the SSRLIR message, the V-SLP returns the session id to the H-SLP through an SSRLIA message.

Block 509 is similar to Block 409.

Block 510 is similar to Block 410, and "proceed to Block 411; otherwise, proceed to Block 413" in Block 410 should be replaced by "proceed to Block 511; otherwise, proceed to Block 513".

Block 511 is similar to Block 411, and "proceed to Block 413; otherwise, proceed to Block 412" in Block 411 should be replaced by "proceed to Block 513; otherwise, proceed to Block 512".

Blocks 512-513 are similar to Blocks 412-413.

Block 514: After receiving the SUPL POS INIT message, the H-SLP forwards the SUPL POS INIT message to the V-SLP; after receiving the SUPL POS INIT message, the V-SLP verifies whether the position estimate of the target SET corresponding to the lid carried in the SUPL POS INIT message meets the requested QoP. If the position estimate of the target SET corresponding to the lid carried in the SUPL POS INIT message meets the requested QoP, the V-SLP sends the position estimate of the target SET to the H-SLP and releases resources related to the positioning session and proceed to Block 516; otherwise, proceed to Block 515.

Block 515 is similar to Block 415, and the difference is that "H-SLP" in Block 415 should be replaced by "V-SLP", and after receiving the position estimate of the target SET, the V-SLP sends the position estimate of the target SET to the H-SLP and releases resources related to the positioning session.

In the SUPL positioning procedure, the target SET and the V-SLP may exchange several successive positioning procedure messages which are forwarded by the H-SLP.

Blocks 516-517 are similar to Blocks 416-417.

Likewise, corresponding to the SET-initiated positioning procedure, the V-SLP may include a V-SLC and a V-SPC in practical applications. Specifically, the SUPL positioning procedure may be implemented by the V-SPC cooperating with the target SET after the target SET is roaming. FIG. 6 is a message flow of a network-initiated roaming case with V-SPC positioning. As shown in FIG. 6, the differences between FIG. 6 and FIG. 4 are given as follows.

Block 601 is similar to Block 401.

Block 602 is similar to Block 402, and "proceed to Block 403; otherwise, proceed to Block 408" in Block 412 should be replaced by "proceed to Block 603; otherwise, proceed to Block 608".

Block 603 is similar to Block 403, and "proceed to Block 404; otherwise, proceed to Block 417" in Block 403 should be replaced by "proceed to Block 604; otherwise, proceed to Block 618".

Block 604 is similar to Block 404, and the difference is that if the H-SLP verifies that the target SET supports the SUPL protocol, proceed to Block 605.

Blocks 605-607: are similar to Blocks 405-407.

Block 608: The H-SLP verifies whether the target SET is currently roaming and stores the verification result and sends the session id, the msid and the QoP to the V-SLC where the target SET is roaming through an SSRLIR message; the V-SLC returns the session id, the address of the V-SLC to the H-SLP through an SSRLIA message after receiving the SSRLIR message.

Block 609 is similar to Block 409.

Block 610 is similar to Block 410, and "proceed to Block 411; otherwise, proceed to Block 413" in Block 410 should be replaced by "proceed to Block 611; otherwise, proceed to Block 613".

Block 611 is similar to Block 411, and "proceed to Block 413; otherwise, proceed to Block 412" in Block 411 should be replaced by "proceed to Block 613; otherwise, proceed to Block 612".

Block 612 is similar to Block 412.

Block 613: The target SET sends an SUPL POS INIT message to the V-SPC.

Block 614: After receiving the SUPL POS INIT message, the V-SPC converts the lid carried in the SUPL POS INIT message into the position estimate of the target SET, and verifies whether the position estimate of the target SET corresponding to the lid meets the requested QoP. If the position estimate of the target SET corresponding to the lid meets the requested QoP, proceed to Block 615; otherwise, proceed to Block 616.

The conversion of the lid into the position estimate of the target SET may also be implemented by the V-SLC.

Block 615: The V-SPC sends the position estimate of the target SET to the H-SLP, and proceed to Block 617.

Block 616 is similar to Block 415, and the difference is that "H-SLP" in Block 415 is to be replaced by "V-SPC", and the V-SPC sends the position estimate of the target SET to the H-SLP after obtaining the position estimate of the target SET.

Block 617 is similar to Block 416, and "H-SLP" in Block 416 should be replaced by "V-SPC".

Block 618 is similar to Block 417.

As can be seen from above, in the SET-initiated and the network-initiated SUPL procedures, only the target SET or the client initiating the positioning request can obtain the position estimate of the target SET. If granted by the target SET, the SLP, e.g., the H-SLP and the V-SLP may also obtain the position estimate of the target SET. However, along with the development of communication technologies, location services are becoming increasingly richer. In some positioning procedures, besides the target SET or the client initiating the positioning request, a third party client may desire to obtain the position estimate of the target SET. For example, supposing that SET1 is able to initiate an emergency positioning request and SET2 is a guardian of SET1. Then under emergency, the SET1 starts an emergency positioning function to initiate a self-positioning request to the H-SLP. After the positioning succeeds, the position estimate of the SET1 is informed to the SET2. More specifically, for example, when pursuing an escaped criminal, a mobile terminal of a police station may initiate, acting as a client, a positioning request to the H-SLP through the SUPL Agent. After obtaining the position estimate of the escaped criminal, the H-SLP needs to inform the client of the position estimate but also related terminals in the police station. There are no corresponding specifications in the current SUPL protocol.

SUMMARY OF THE INVENTION

Embodiments of the present invention provide a method and a system of Secure User Plane Location (SUPL), so as to inform a third party client of a position estimate in an SUPL procedure and extend the application scope of the SUPL protocol.

According to an embodiment of the present invention, the method of SUPL includes: upon the receipt a positioning request to position a target SUPL Enabled Terminal (SET) from an SUPL Agent, obtaining, by a Home SUPL Location Platform (H-SLP) of the target SET, position estimate of the target SET; sending, by the H-SLP, a notification message carrying the position estimate of the target SET to a third party client according to information of the third party client.

According to another embodiment of the present invention, a system of SUPL includes: an SUPL Agent, sending a positioning request carrying an id of a target SET; a Home-SUPL Location Platform (H-SLP), obtaining a position estimate of a target SET corresponding to the id of the target SET and sending the position estimate of the target SET; a third party client, receiving the position estimate of the target SET from the H-SLP.

In embodiments of the present invention, the H-SLP starts the positioning procedure to a target SET after receiving a positioning request from the SUPL Agent, obtains the position estimate of the target SET and sends the position estimate of the target SET to the third party client according to the information of the third party client. Compared with the related art, the technical solutions in accordance with the embodiments of the present invention meet the demand of informing the third party client of the position estimate of the target SET and extend the application scope of the SUPL protocol.

EMBODIMENTS OF THE INVENTION

The present invention is hereinafter described in detail with reference to accompanying drawings and detailed embodiments.

Figure 7:
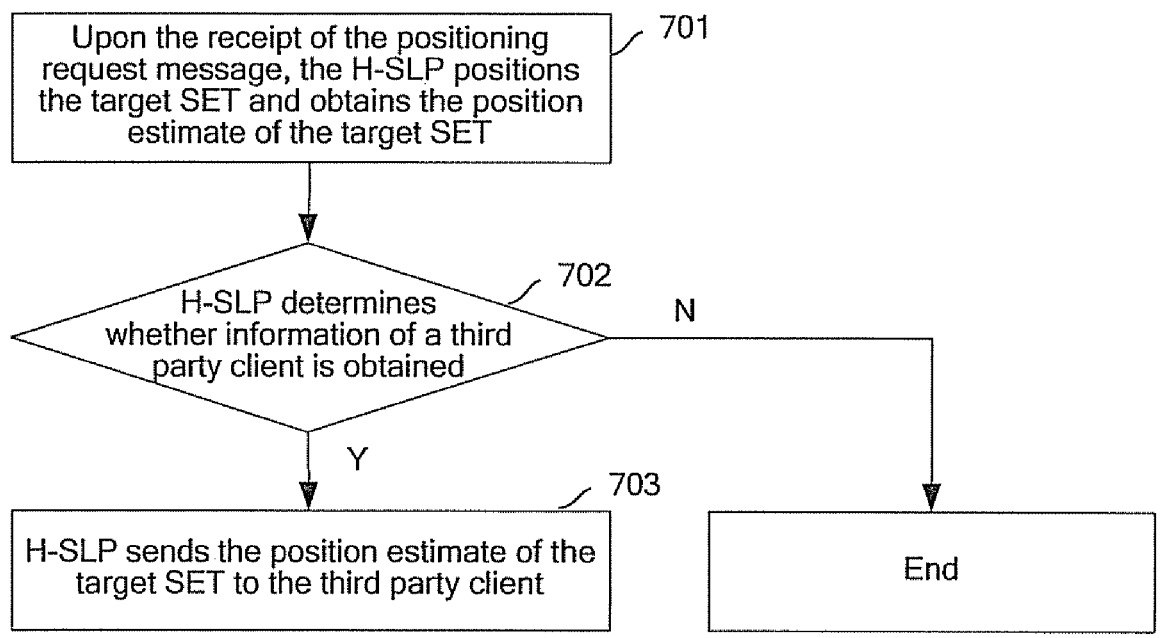
FIG. 7 is a message flow of a SUPL case according to an embodiment of the present invention.

FIG. 7 is a message flow of an SUPL case according to an embodiment of the present invention. As shown in FIG. 7, the detailed process is given as follows.

Block 701: Upon receipt of a positioning request from an SUPL Agent, an H-SLP of a target SET starts a positioning procedure towards the target SET and obtains a position estimate of the target SET after the positioning procedure.

If the positioning request is a self positioning request initiated by the target SET through the SUPL Agent on the target SET, the positioning request carries only an msid. If the positioning request is initiated by a client through the SUPL Agent at the network side associated with the H-SLP, the positioning request carries the msid and the client-id.

Block 702: The H-SLP verifies whether information of a third party client has been obtained. If the information of the third party client has been obtained, perform block 703; otherwise, end the procedure.

The information of the third party client includes: id of the third party client and service information registered by the third party client.

The H-SLP may obtain the information of the third party client through the following four approaches.

Approach 1: obtaining the information of the third party client from the positioning request.

The positioning request may carry the information of the third party client. For an SET-initiated SUPL procedure, the positioning request is an SUPL START message. For a network-initiated SUPL procedure, the positioning request is an MLP SLIR message.

Approach 2: obtaining the information of the third party client from registration information of the target SET and/or the client, wherein the registration information is stored by the corresponding H-SLP of the target SET and/or the client.

The target SET and/or the client may register the information of the third party client when registering to their corresponding H-SLP; and the H-SLP stores the information of the third party client in the register information corresponding to the target SET and/or the client.

Approach 3: obtaining the information of the third party client from privacy information in the PCE, wherein the privacy information is reported by the target SET and/or the client.

The target SET and/or the client may report information of the third party client to the PCE when registering the location service and the PCE stores the information of the third party client in the privacy information corresponding to the target SET and/or the client.

Approach 4: obtaining the information of the third party client according to the type of the location service carried in the positioning request sent by the SUPL Agent and a corresponding relationship between the type of the location service and the information of the third party client stored by the H-SLP.

The H-SLP pre-stores the corresponding relationship between the type of the location service and the information of the third party client. When sending a positioning request to the H-SLP, the SUPL Agent carries the type of the location service in the positioning request. After receiving the positioning request, the H-SLP obtains the information of the third party client from the corresponding relationship between the type of location service and the information of the third party client stored by the H-SLP according to the type of the location service carried in the positioning request message.

It should be noted that, when reporting information of the third party client to the H-SLP or the PCE, the target SET may reports information indicating whether the third party client needs notification and/or verification by the target SET. In a network-initiated SUPL procedure, if the information of the third party client obtained by the H-SLP includes information that requires notification and/or verification by the target SET, the H-SLP needs to send a notification and/or verification request message carrying the id of the third party client to the target SET before sending the position estimate of the target SET to the third party client. After receiving a notification and/or verification response message carrying the id of the third party client granted by the target SET, the H-SLP sends the position estimate of the target SET to the third party client corresponding to the id of the third party client granted. Specifically, after receiving the notification and/or verification request message, the target SET may display the id of the third party client carried in the notification and/or verification request message to a user to select the id of the third party client to be granted, and sends the id of the third party client selected by the user to the H-SLP through a notification and/or verification response message after selecting the user.

The number of the third party client may be one or more than one.

Block 703: The H-SLP sends the position estimate of the target SET to the third party client.

In practical applications, the position estimate of the target SET may be carried in a location notification message which may carry the msid.

The location notification message may be a WAP PUSH or an SMS trigger.

For security, the H-SLP may also carry a Key Id and a MAC in the location notification message. After receiving the location notification message, the third party client verifies the Key Id and the MAC. If the verification succeeds, accept the location notification message; otherwise, neglect the location notification message.

If there is more than one third party client, the H-SLP sends the location notification message to all the third party clients.

After receiving the location notification message, the third party client may do nothing or return a location notification response message to the H-SLP to indicate that the location notification message has been successfully received and releases related resources. Specifically, the SUPL Agent may carry information indicating whether the third party client is required to return a location notification response message in the positioning request. After receiving the position estimate of the target SET and before sending the position estimate of the target SET to the third party client via the location notification message, the H-SLP verifies whether the positioning request sent by the SUPL Agent includes the information requiring the third party client to return a location notification response message; if the positioning request includes the information requiring the third party client to return a location notification response message, the H-SLP carries information requiring the third party client to return a location notification response message in the location notification message; and after receiving the location notification message and determining that the location notification message includes the information requiring to return a location notification response message, the third party client returns a location notification response message to the H-SLP.

For security, if the H-SLP requires the third party client to return a location notification response message, the H-SLP calculates and stores a Hash of the location notification message according to an algorithm defined by the SUPL protocol before sending the location notification message to the third party client. After receiving the location notification message, the third party client calculates the Hash of the location notification message according to the algorithm defined by the SUPL protocol, and carries the Hash calculated in a verification field element of the location notification response message to send to the H-SLP. The H-SLP verifies whether the Hash carried in the location notification response message matches the Hash stored by the H-SLP after receiving the location notification response message; if the Hash carried in the location notification response message matches the Hash stored by the H-SLP, accept the location notification response message; otherwise, neglect the location notification response message.

The security mechanism between the H-SLP and the third party client employs security mechanism defined in the SUPL protocol. In the SUPL protocol, the Hash of a message is obtained through a calculation for the message according to a defined algorithm. An SUPL entity adopting the security mechanism may obtain, before sending a message or after receiving a message, the Hash of the message by calculating according to the algorithm defined in the security mechanism in the SUPL protocol.

In addition, the H-SLP may pre-configure a timer waiting for a location notification response. From the moment of sending the location notification message to the third party client, if the H-SLP does not receive the location notification response message and the timer does not expires, the H-SLP determines that the third party client has not received the location notification message and sends the location notification message to the third party client again. If the H-SLP does not receive the location notification response message until the timer expires, the H-SLP may indicate, in a location notification response message or an SLIA message to the SUPL Agent, that the notification to the third party client is failed.

If there is more than one third party client, the H-SLP may list the ids of all the third party clients successfully notified in the location notification response message or the SLIA message. If notifications to all the third party clients are failed, the H-SLP may indicate that the current location notification is failed in the location notification response message or the SLIA message.

To return the location notification response message to the H-SLP, the third party client generally uses the address of the H-SLP provisioned by the home network of the third party client to establish a secure IP connection to the H-SLP, or the third party client may also use the address of the H-SLP carried in the SUPL notification message to establish a secure IP connection to the H-SLP. If the SUPL notification message does not carry the address of the H-SLP, the third party client may use a default address of the H-SLP configured by the third party client to establish a secure IP connection to the H-SLP. If the third party client needs to communicate with the H-SLP via an IP connection, the third party client directly attaches itself to a PDN, or attaches itself to the PDN through establishing a circuit switched data connection if the third party client detects, after receiving the SUPL notification message, that the third party client is not already attached to the PDN.

The H-SLP may not return a positioning end message, e.g., SUPL END message or SLIA message, to the SUPL Agent initiating the positioning request immediately after obtaining the position estimate of the target SET. Instead, the H-SLP may send a positioning end message carrying the notification result indicating whether the third party client has received the position estimate of the target SET to the SUPL Agent initiating the positioning request after receiving a location notification response message from the third party client or after the timer waiting for the location notification response message expires. Or, the H-SLP may also send the positioning end message to the SUPL Agent initiating the positioning request immediately after obtaining the position estimate of the target SET, and after receiving the location notification response message from the third party client or after the timer waiting for a location notification response message expires, sends a location notification response message carrying the notification result indicating whether the third party client has received the location of the target SET to the SUPL Agent initiating the positioning request.

Figure 1:
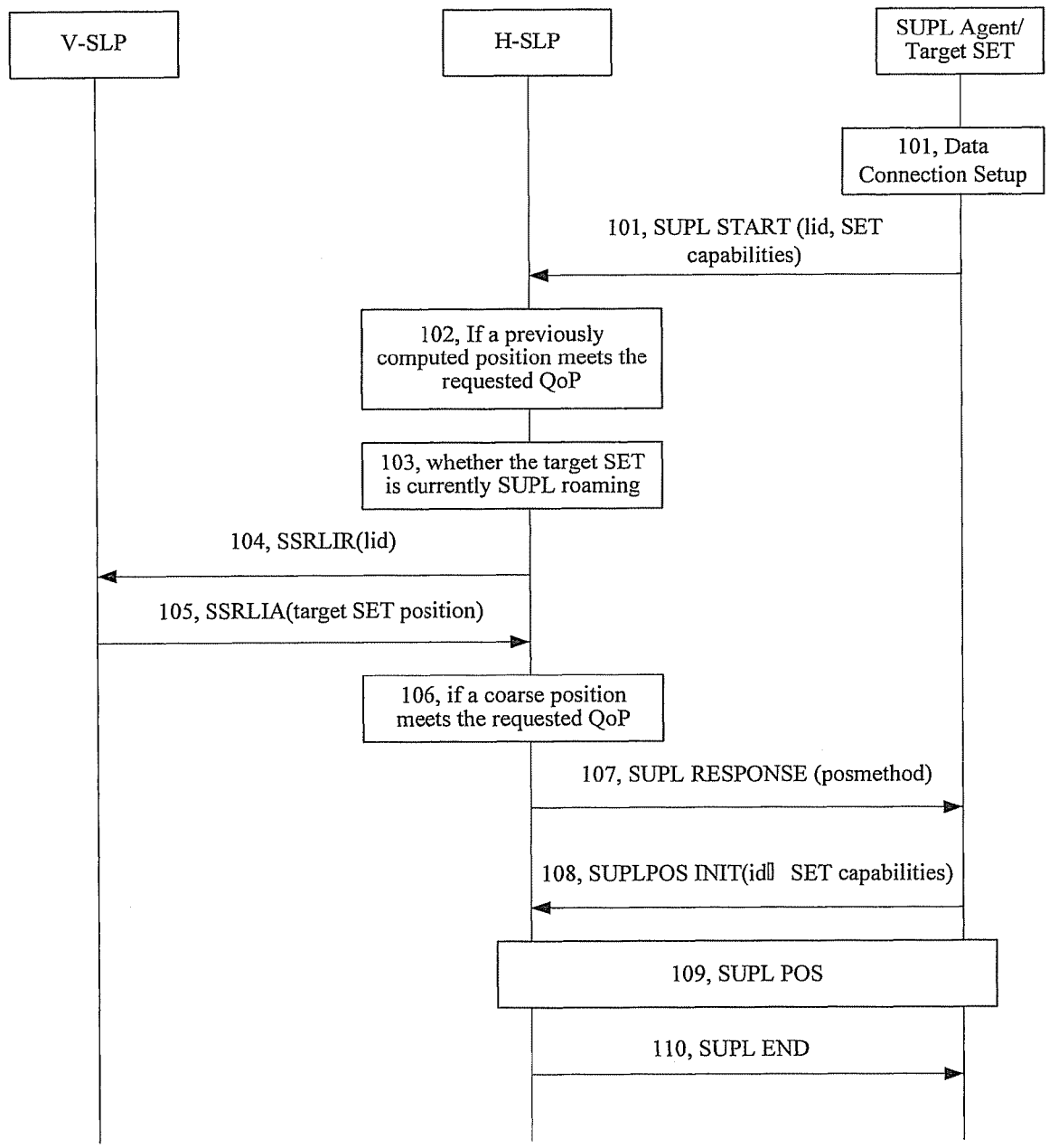
FIG. 1 is a message flow of a target SET-initiated SUPL case with H-SLP positioning according to the related art.
Figure 8:
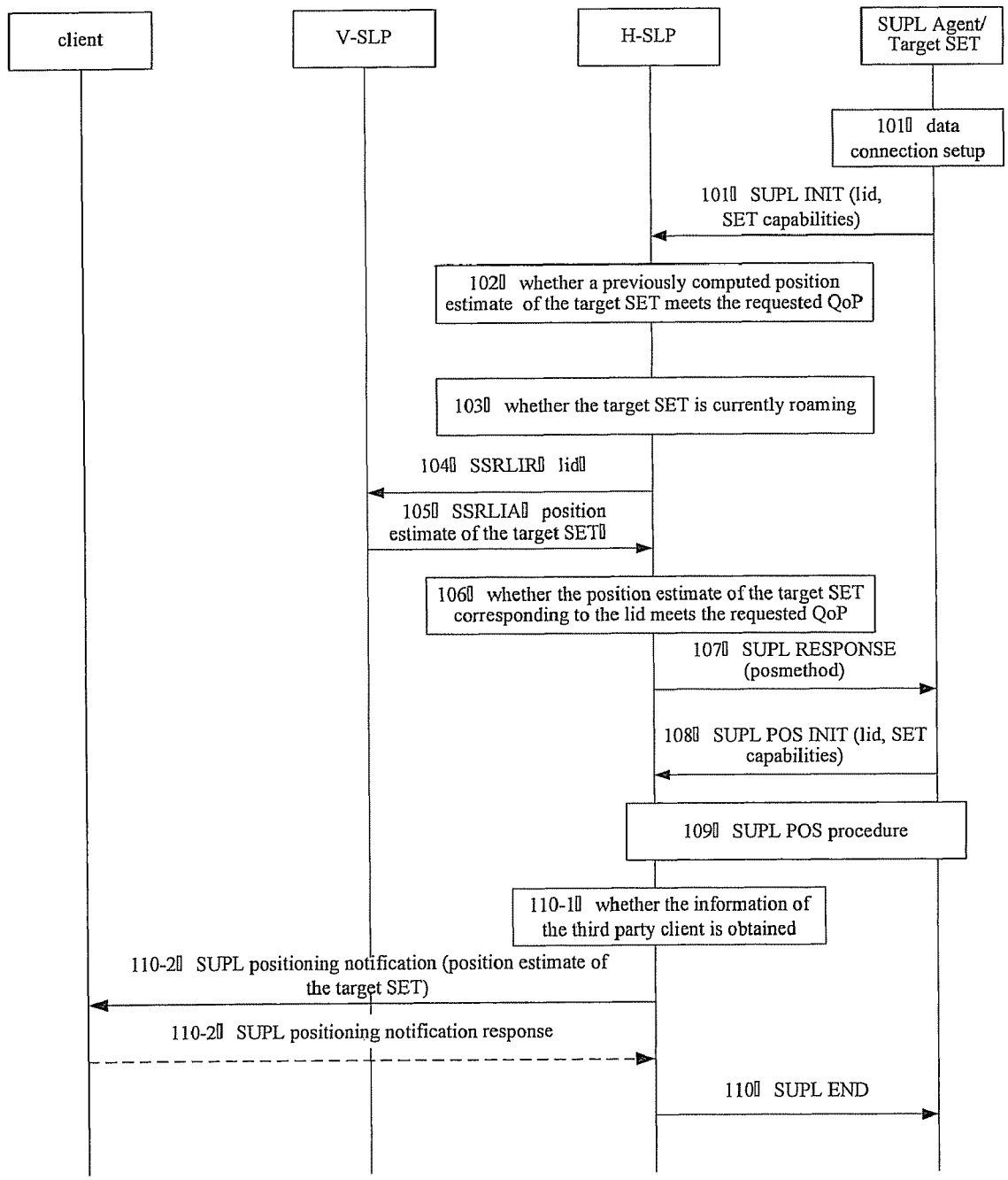
FIG. 8 is a message flow of a target SET-initiated SUPL case with H-SLP positioning according to an embodiment of the present invention.

FIG. 8 is a message flow of a target SET-initiated SUPL case with H-SLP positioning according to an embodiment of the present invention. According to FIG. 1 and FIG. 8, the differences between the procedures are given as follows.

Blocks 110-1 and 110-2 may be inserted between Blocks 109 and 110.

Block 110-1 is similar to Block 702 and "proceed to Block 703" should be replaced by "proceed to Block 110-2".

Block 110-2 is similar to Block 703, and "proceed to Block 110" in Block 102 should be replaced by "proceed to Block 110-1".

Furthermore, the SUPL END message in Block 110 may also carry a notification result indicating whether the third party client has received the position estimate of the target SET.

If the H-SLP includes an H-SLC and an H-SPC, the H-SLP in Blocks 110-1 and 110-2 specifically refers to the H-SLC. Block 109 further includes: the H-SPC notifies the H-SLC of the position estimate of the target SET. Between Blocks 110-2 and 110, the method may further include Block 110-3: the H-SLC sends the notification result indicating whether the third party client has received the position estimate of the target SET to the H-SPC.

It should be noted that Blocks 110-1 and 110-2 may also be performed after Block 110. After Block 110-2, the method may further include Block 110-3: the H-SLP sends the notification result indicating whether the third party client has received the position estimate of the target SET to the target SET.

Figure 2:
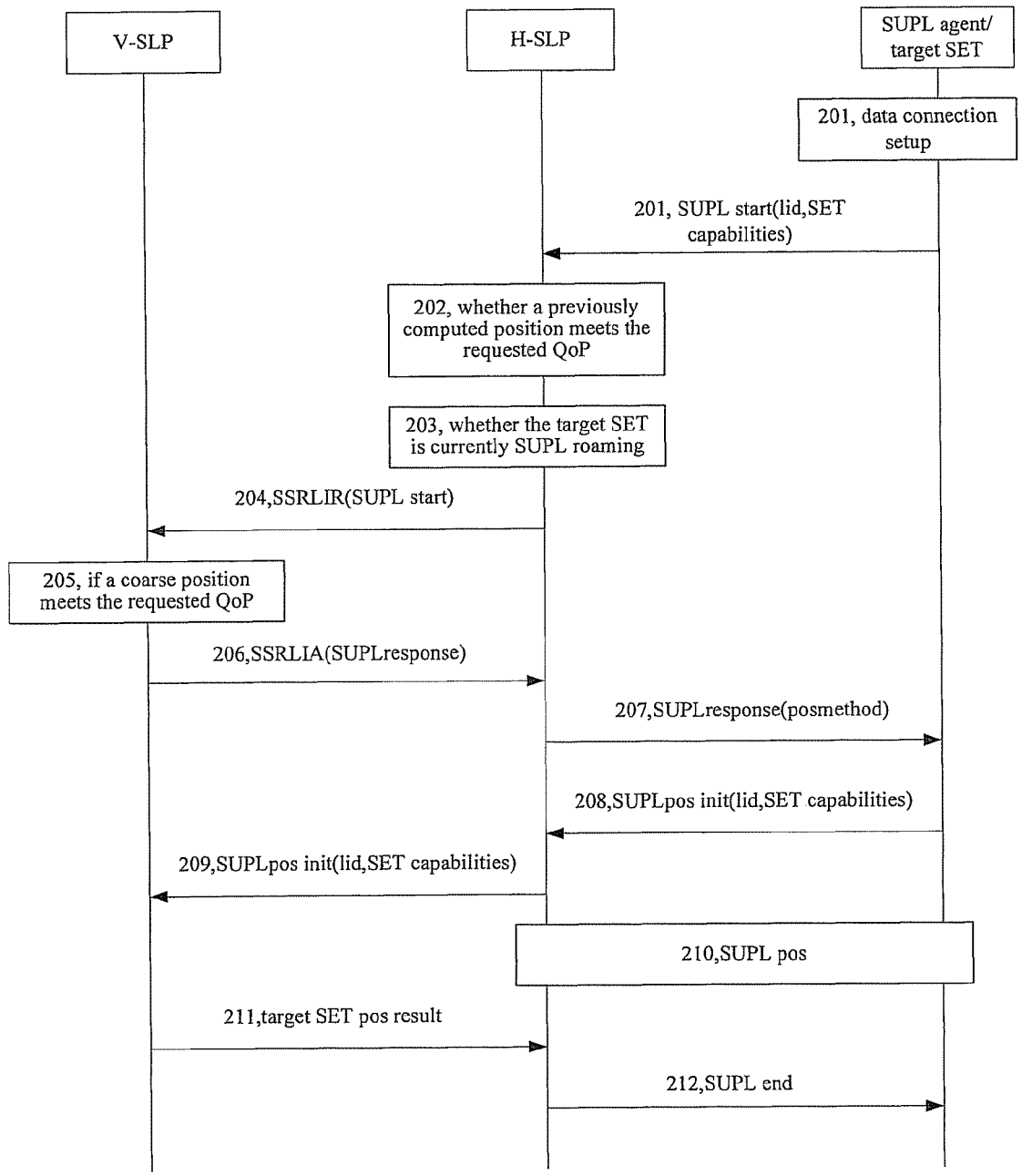
FIG. 2 is a message flow of a target SET-initiated roaming case with V-SLP positioning according to the related art.
Figure 9:
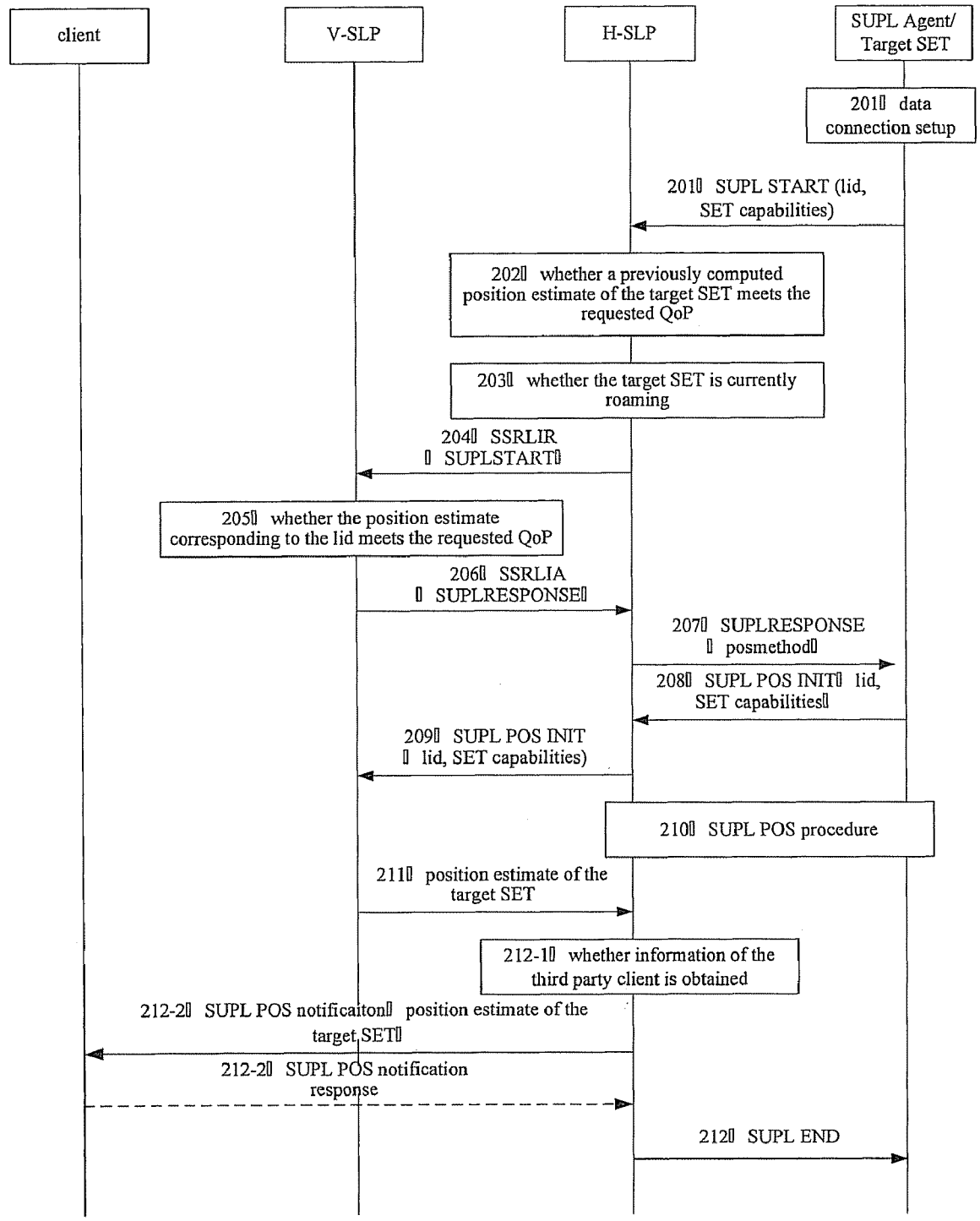
FIG. 9 is a message flow of a target SET-initiated roaming case with the V-SLP positioning according to an embodiment of the present invention.

FIG. 9 is a message flow of a target SET-initiated roaming case with the V-SLP positioning according to an embodiment of the present invention. According to FIG. 2 and FIG. 9, the differences between the procedures are given as follows.

Blocks 212-1 and 212-2 may be inserted between Blocks 211 and 212.

Block 212-1 is similar to Block 702, and the "proceed to Block 703" should be replaced by "proceed to Block 212-2".

Block 212-2 is similar to Block 703.

The "proceed to Block 212" in Blocks 202 and 205 should be replaced by "proceed to Block 212-1".

Furthermore, the SUPL END message in Block 212 may carry a notification result indicating whether the third party client has received the location of the target SET.

Likewise, Blocks 212-1 and 212-2 may also be performed after Block 212. After Block 212-2, the method may further include Block 212-3: the H-SLP sends the notification result indicating whether the third party client has received the location of the target SET to the target SET.

Figure 3:
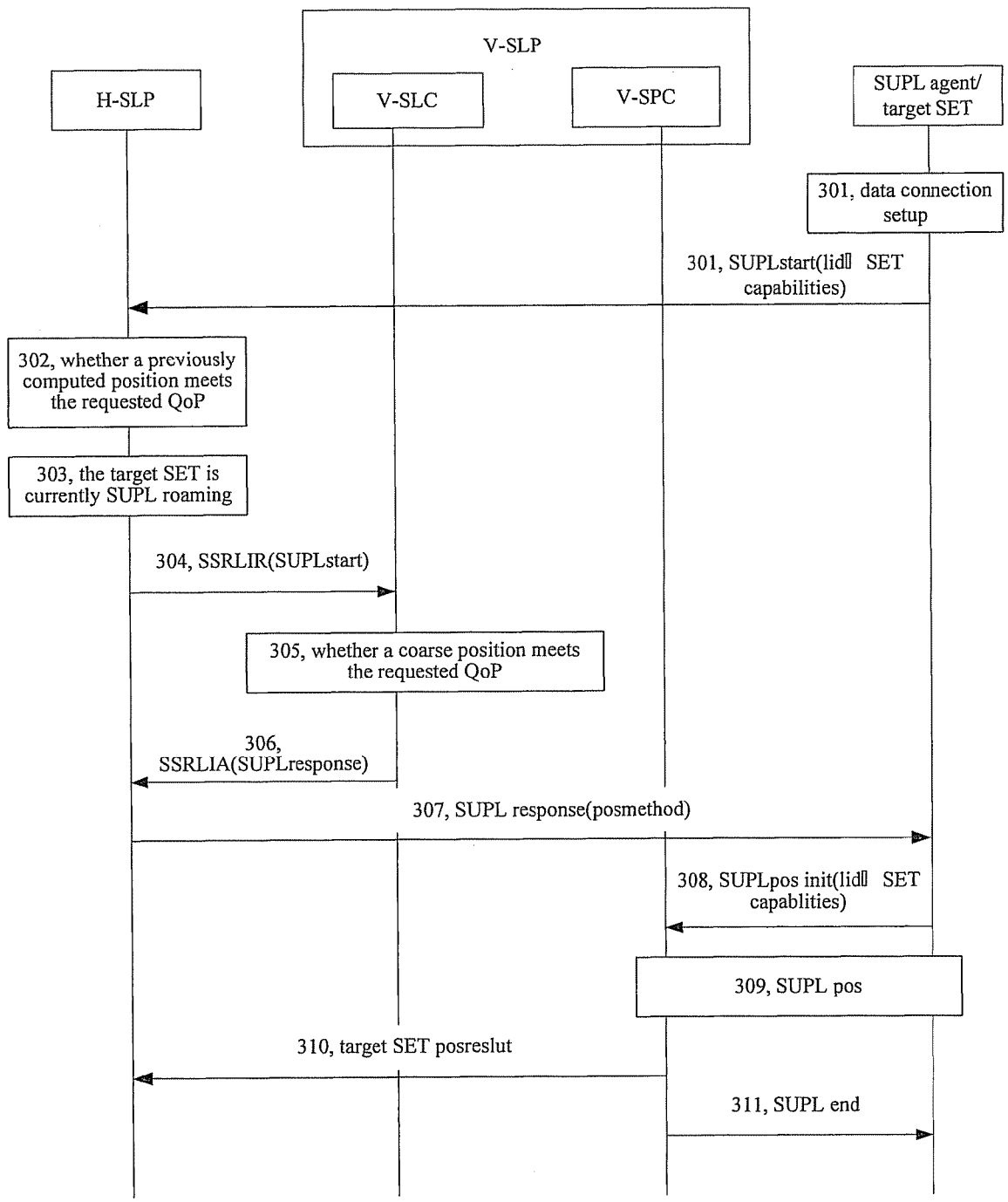
FIG. 3 is a message flow of a target SET-initiated roaming case with V-SPC positioning according to the related art.
Figure 10:
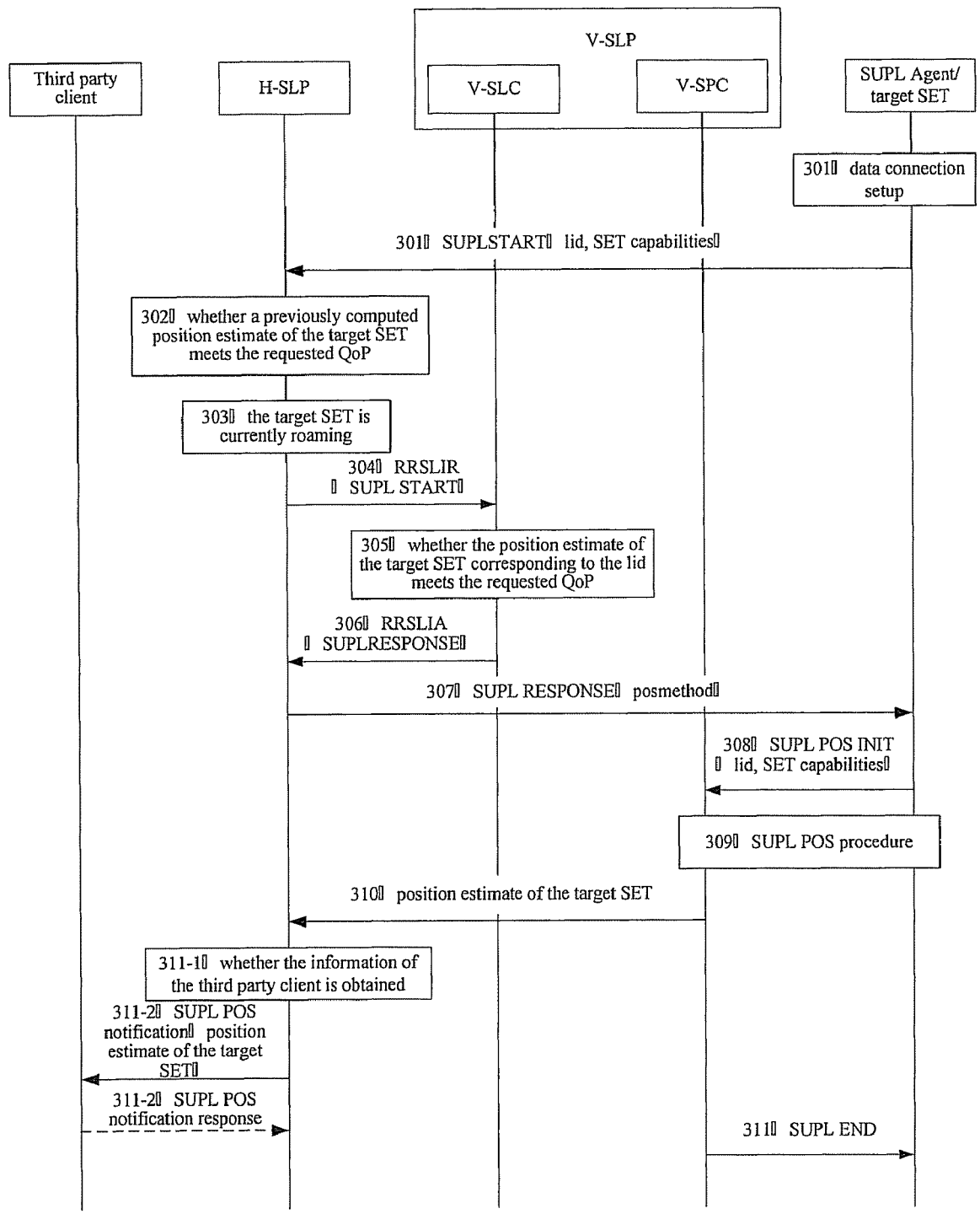
FIG. 10 is a message flow of a target SET-initiated roaming case with V-SPC positioning according to an embodiment of the present invention.

FIG. 10 is a message flow of a target SET-initiated roaming case with V-SPC positioning according to an embodiment of the present invention. As shown in FIG. 3 and FIG. 10, the differences between the procedures are given as follows.

Blocks 311-1 is inserted after the H-SLP verifies whether a previously computed position estimate of the target SET meets the requested QoP and before the H-SLP sends the SUPL END message to the target SET in Block 302; and Block 311-2 is inserted between Blocks 310 and 311.

Block 311-1 is similar to Block 702 and "proceed to Block 703" should be replaced by "proceed to Block 311-2".

Block 311-2 is similar to Block 703.

Accordingly, "proceed to Block 311" in Block 305 should be replaced by "proceed to Block 311-1".

Furthermore, the SUPL END message in Block 302 may carry a notification result indicating whether the third party client has received the location of the target SET.

Likewise, Blocks 311-1 and 311-2 may also be performed after the H-SLP sends the SUPL END message carrying the position estimate of the target SET to the target SET in Block 302 and before this procedure ends, or be performed after Block 311. After Block 311-2, the method may further include Block 311-3: the H-SLP sends the notification result indicating whether the third party client has received the location of the target SET to the target SET.

Figure 4:
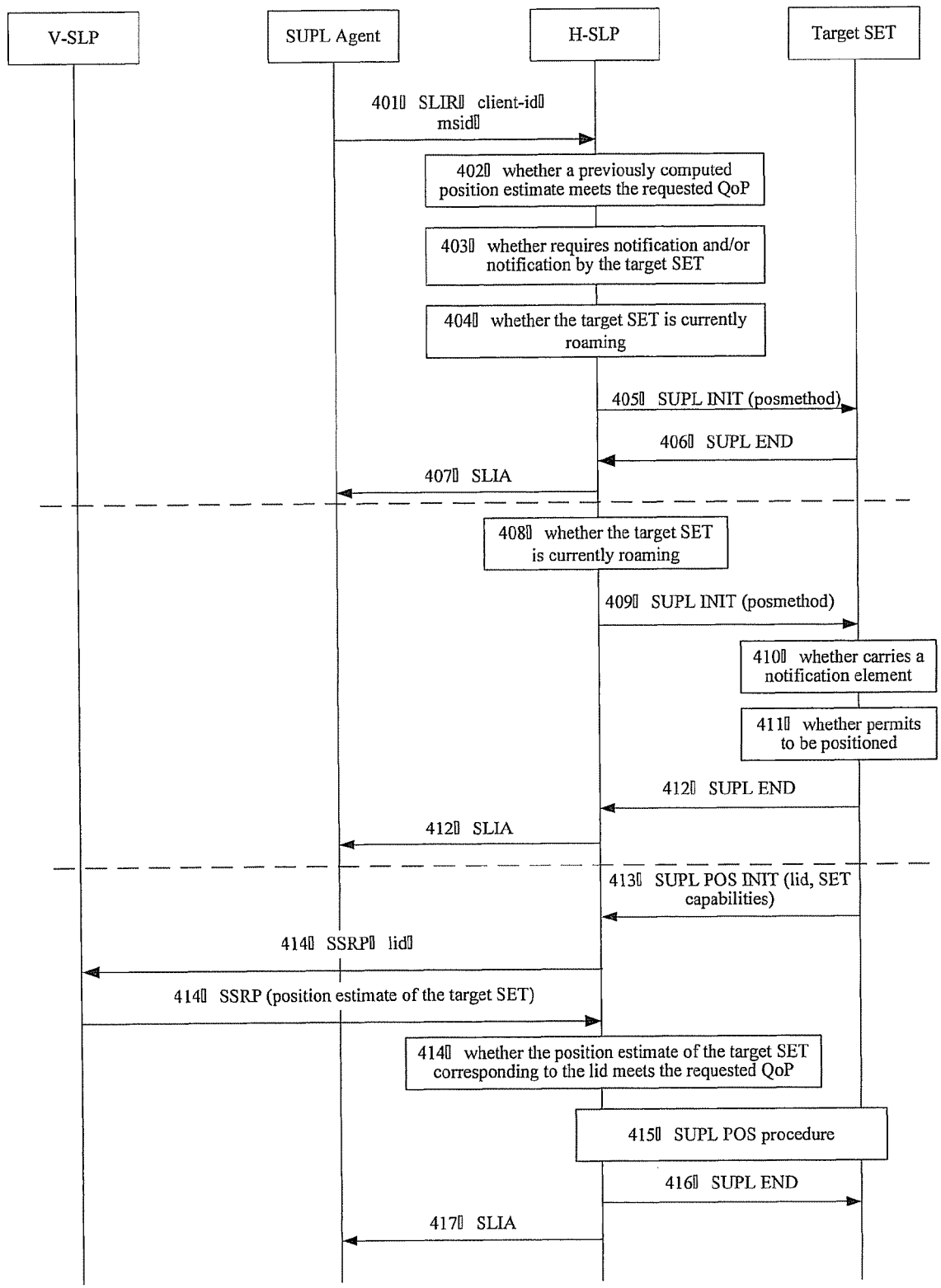
FIG. 4 is a message flow of a network-initiated SUPL case with H-SLP positioning according to the related art.
Figure 11:
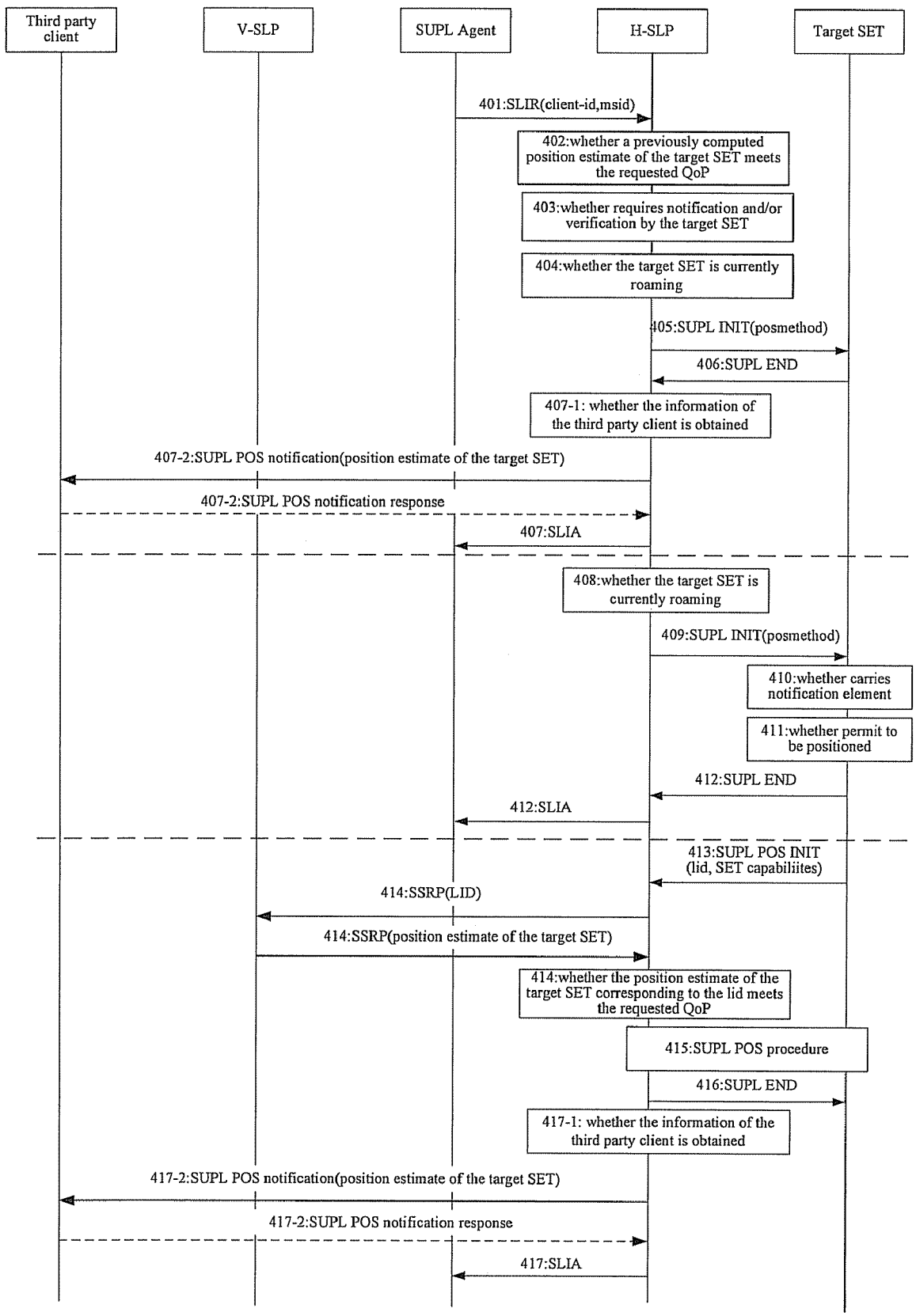
FIG. 11 is a message flow of network-initiated SUPL case with H-SLP positioning according to an embodiment of the present invention.

FIG. 11 is a message flow of network-initiated SUPL case with H-SLP positioning according to an embodiment of the present invention. According to FIG. 4 and FIG. 11, the differences between the procedures are given as follows:

Blocks 407-1 and 407-2 are inserted between Blocks 406 and 407.

Block 407-1 is similar to Block 702, and "proceed to Block 703" should be replaced by "proceed to Block 407-2".

Block 407-2 is similar to Block 703.

Blocks 417-1 and 417-2 are inserted between Blocks 416 and 417.

Block 417-1 is similar to Block 702, and "proceed to Block 703" should be replaced by "proceed to Block 417-2".

Block 417-2 is similar to Block 703.

Accordingly, "proceed to Block 417" in Block 403 should be replaced by "proceed to Block 417-1".

Furthermore, before Blocks 405 and 409, the method may further include:

the H-SLP obtains information of the third party client, and after determining that the information of the third party client includes information that requires notification and/or verification by the target SET, the H-SLP carries the id of the third party client requires notification and/or verification by the target SET in an SUPL INIT message. Meanwhile, the SUPL END message returned by the target SET to the H-SLP in Block 406 and the SUPL POS INIT message returned by the target SET to the H-SLP in Block 413 carry the id of the third party client granted to be notified. The H-SLP stores the id of the third party client granted to be notified. The third party client corresponding to the id granted to be notified is the one to which the H-SLP sends the location notification message.

Furthermore, in Block 407, besides the positioning failure parameter and the position estimate of the target SET, the MLP SLIA message sent by the H-SLP to the SUPL Agent may also carry a notification result indicating whether the third party client has received the location of the target SET.

Furthermore, in Block 417, besides the position estimate of the target SET, the MLP SLIA message sent by the H-SLP to the SUPL Agent may also carry a notification result indicating whether the third party client has received the position estimate of the target SET;

If the H-SLP includes an H-SLC and an H-SPC, the H-SLP in Blocks 407-1, 407-2, 417-1 and 417-2 specifically refers to the H-SLC. After the H-SPC verifies that the position estimate of the target SET corresponding to the lid contained in the SUPL POS INIT message meets the requested QoP in Block 414, the method further includes: the H-SPC sends the position estimate of the target SET to the H-SLC. Block 415 further includes: the H-SPC sends the position estimate of the target SET to the H-SLC. Between Blocks 417-2 and 417, the method may further include Block 417-3: the H-SLC sends the notification result indicating whether the third party client has received the location of the target SET to the H-SPC.

Furthermore, if the H-SLP includes an H-SLC and an H-SPC, before Blocks 405 and 409, the method further includes: the H-SLC obtains the information of the third party client, and after determining that the information of the third party client includes information that requires notification and/or verification by the target SET, the H-SLC carries the id of the third party client requires notification and/or verification by the target SET in an SUPL INIT message. The SUPL END message returned by the target SET to the H-SLC in Block 406 and the SUPL POS INIT message returned by the target SET to the H-SPC in Block 413 carry the id of the third party client granted to be notified, and the H-SPC notifies the H-SLC of the id of the third party client granted to be notified. The third party client corresponding to the id granted to be notified is the one to which the H-SLC sends the location notification message.

Likewise, Blocks 407-1 and 407-2 may also be performed after Block 407. After Block 407-2, the method may further include Block 407-3: the H-SLP sends the notification result indicating whether the third party client has received the position estimate of the target SET to the SUPL Agent.

Blocks 417-1 and 417-2 may also be performed after Block 417. After Block 417-2, the method may further include Block 417-3: the H-SLP sends the notification result indicating whether the third party client has received the position estimate of the target SET to the SUPL Agent.

Figure 5:
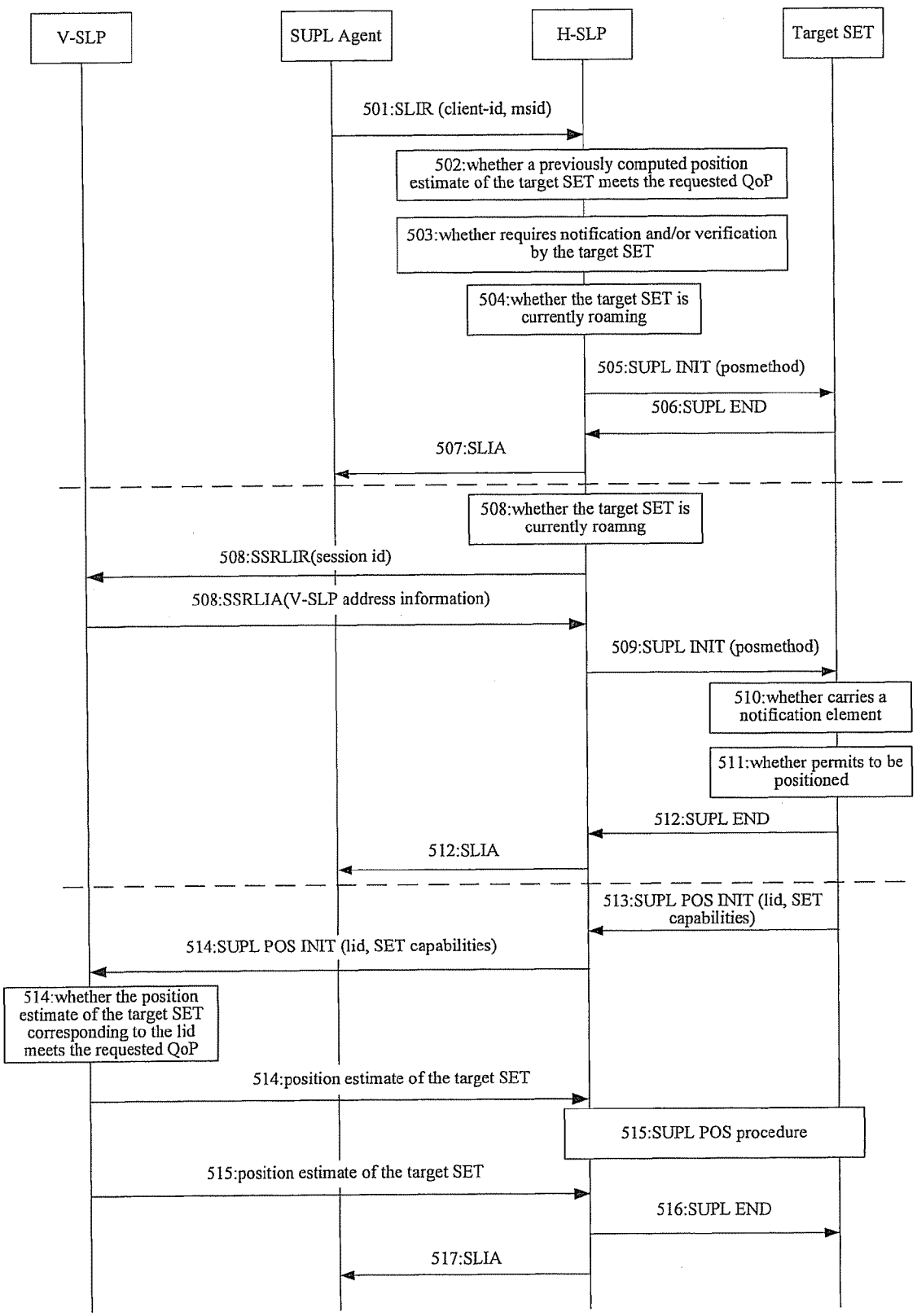
FIG. 5 is a message flow of a network-initiated roaming case with V-SLP positioning according to the related art.
Figure 12:
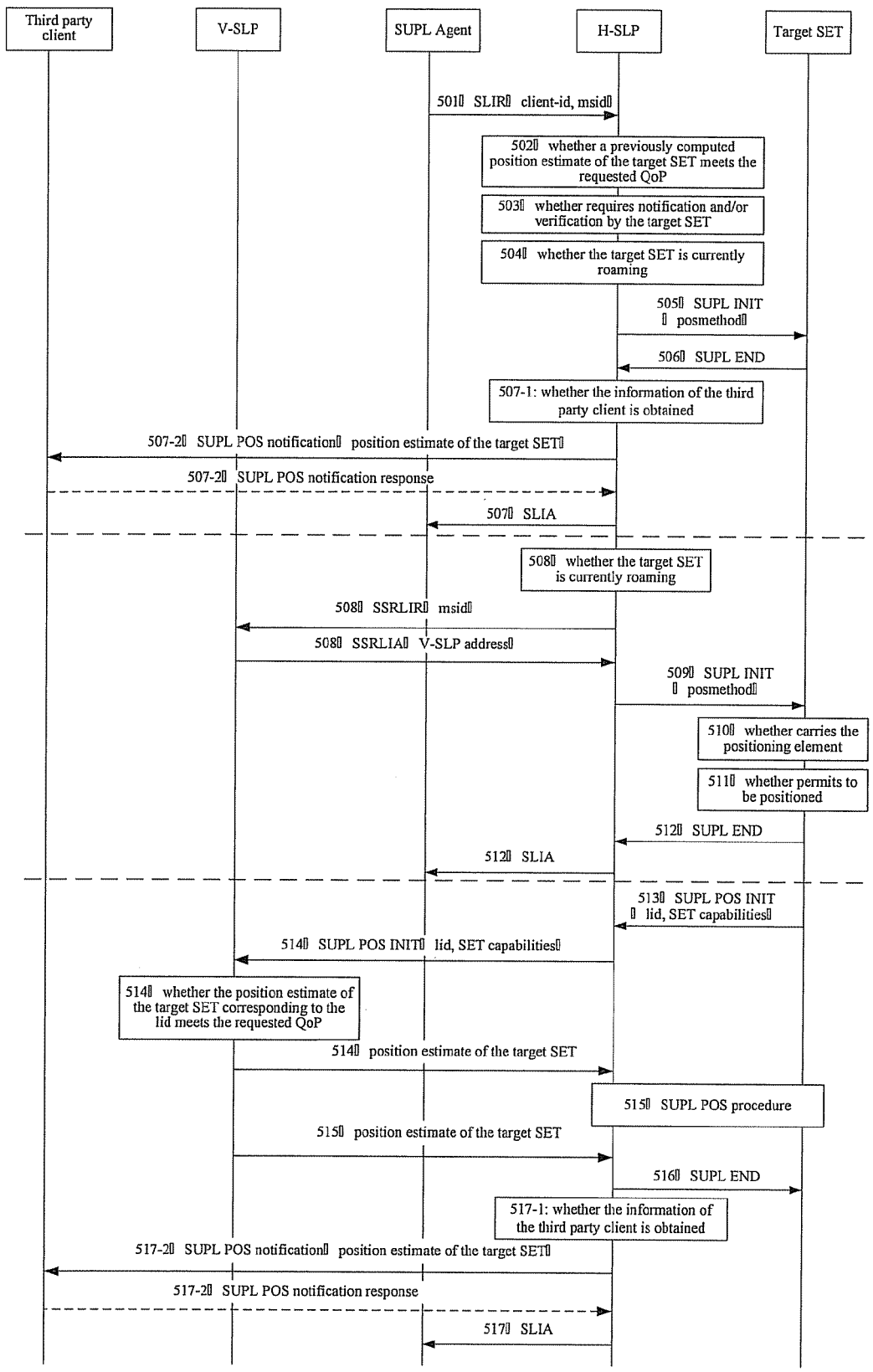
FIG. 12 is a message flow of a network-initiated roaming case with V-SLP positioning according to an embodiment of the present invention.

FIG. 12 is a message flow of a network-initiated roaming case with V-SLP positioning according to an embodiment of the present invention. According to FIG. 5 and FIG. 12, the differences procedures are given as follows.

Blocks 507-1 and 507-2 are inserted between Blocks 506 and 507.

Block 507-1 is similar to Block 702 and "proceed to Block 703" should be replaced by "proceed to Block 507-2".

Block 507-2 is similar to Block 703.

Blocks 517-1 and 517-2 are inserted between Blocks 516 and 517.

Block 517-1 is similar to Block 702 and "proceed to Block 703" should be replaced by "proceed to Block 517-2".

Block 517-2 is similar to Block 703, and "proceed to Block 517" in Block 503 should be replaced by "proceed to Block 517-1".

Furthermore, before Blocks 505 and 509, the method further includes: the H-SLP obtains the information of the third party client, and after determining that the information of the third party client includes information that requires notification and/or verification by the target SET, the H-SLP carries the id of the third party client in an SUPL INIT message. The SUPL END message returned by the target SET to the H-SLP in Block 506 and the SUPL POS INIT message returned by the target SET to the H-SLP in Block 513 carry the id of the third party client granted to be notified. The H-SLP stores the id of the third party client granted to be notified. The third party client corresponding to the id is the one to which the H-SLP sends the location notification message.

Furthermore, in Block 507 and/or Block 517, besides the positioning failure parameter and the position estimate of the target SET, the MLP SLIA message sent by the H-SLP to the SUPL Agent may also carry a notification result indicating whether the third party client has received the location of the target SET.

Likewise, Blocks 507-1 and 507-2 may also be performed after Block 507. After Block 507-2, the method may further include Block 507-3: the H-SLP sends the notification result indicating whether the third party client has received the location of the target SET to the SUPL Agent.

Blocks 517-1 and 517-2 may also be performed after Block 517. After Block 517-2, the method may further include Block 517-3: the H-SLP sends the notification result indicating whether the third party client has received the location of the target SET to the SUPL Agent.

Figure 6:
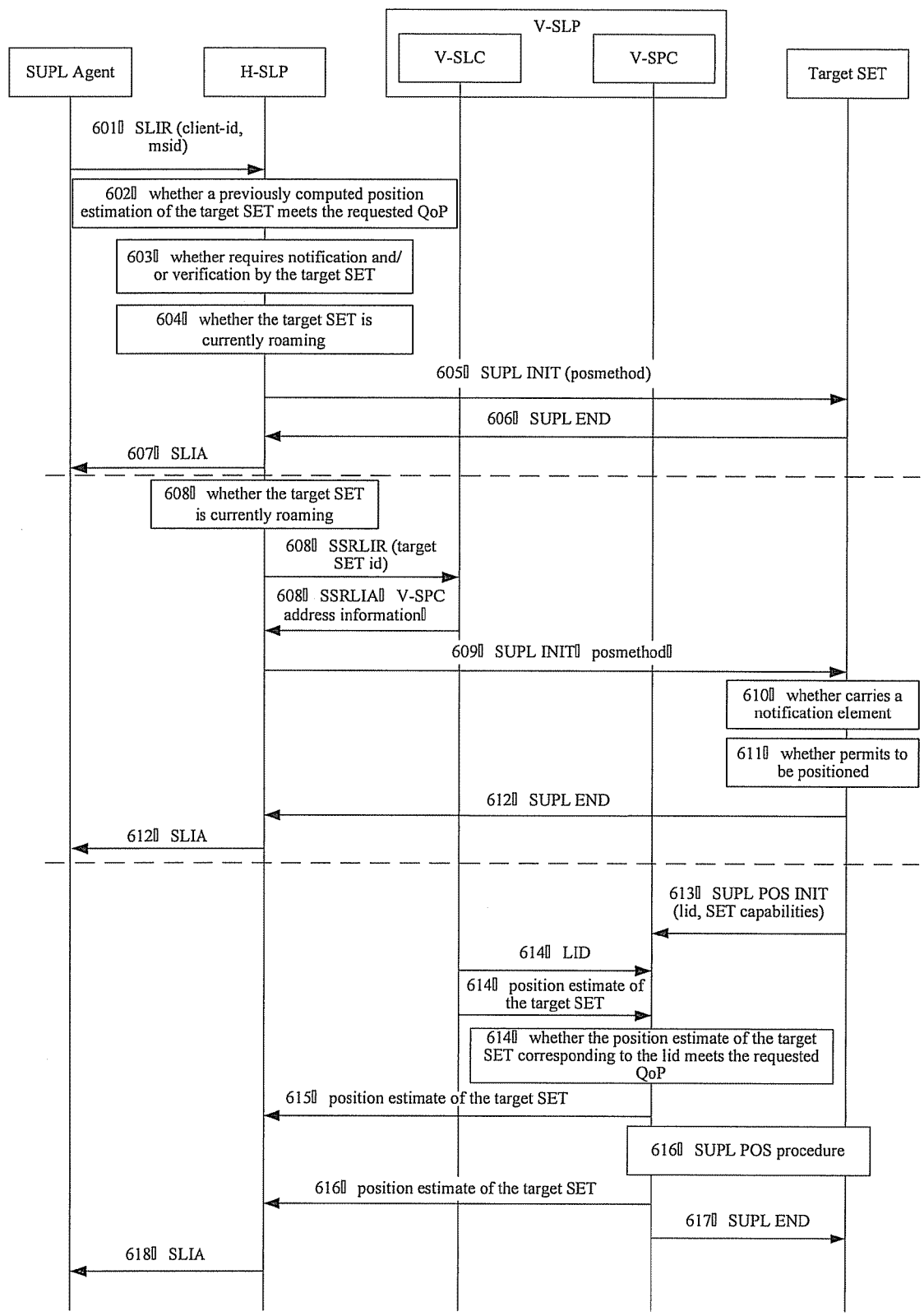
FIG. 6 is a message flow of a network-initiated roaming case with V-SPC positioning according to the related art.
Figure 13:
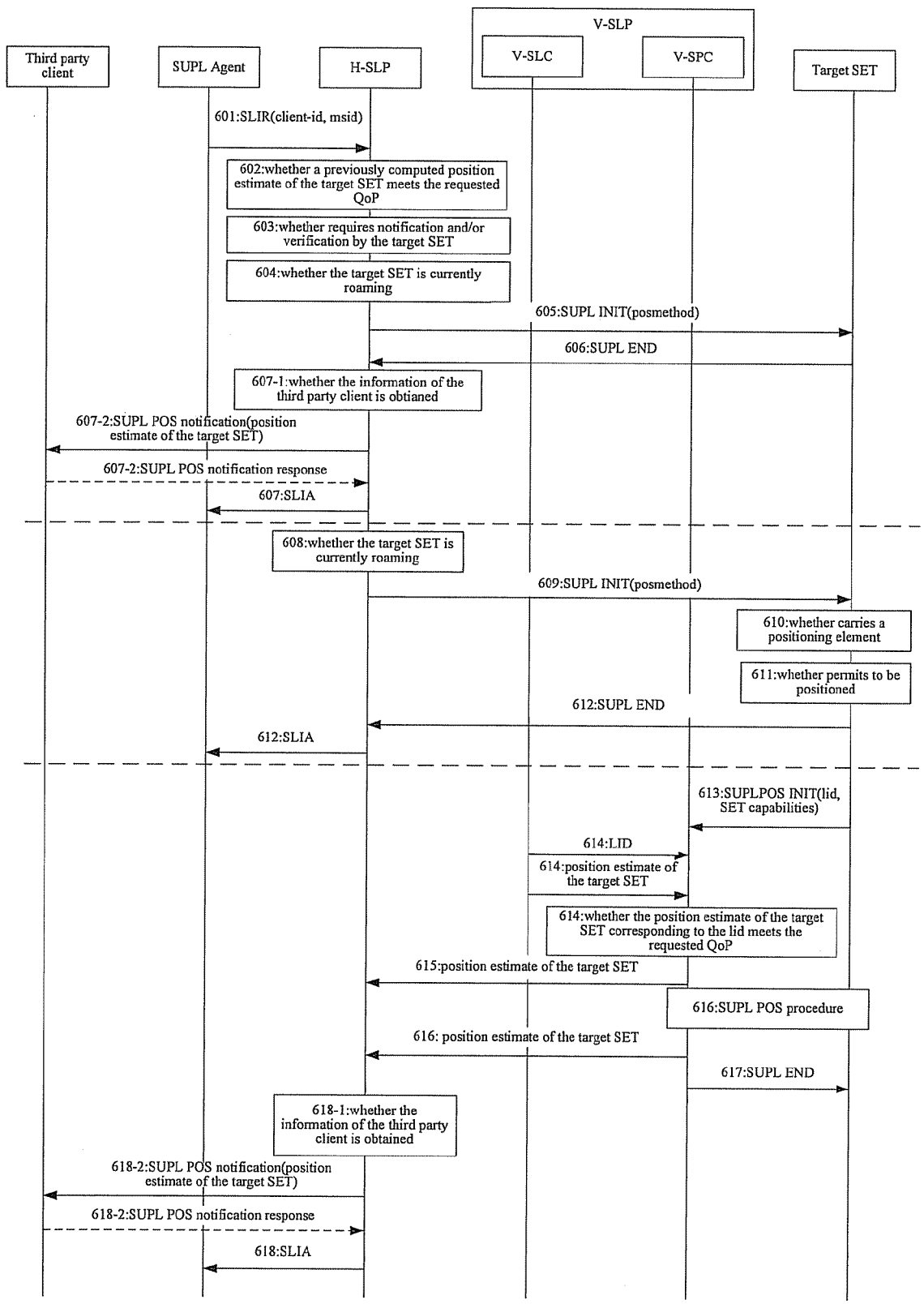
FIG. 13 is a message flow of a network-initiated roaming case with V-SPC positioning according to an embodiment of the present invention.

FIG. 13 is a message flow of a network-initiated roaming case with V-SPC positioning according to an embodiment of the present invention. As shown in FIG. 13, the differences between the procedure shown in FIG. 13 and that shown in FIG. 6 are given as follows.

Blocks 607-1 and 607-2 are inserted between Blocks 606 and 607.

Block 607-1 is similar to Block 702 and "proceed to Block 703" should be replaced by "proceed to Block 607-2".

Block 607-2 is similar to Block 703.

Blocks 618-1 and 618-2 are inserted between Blocks 617 and 618.

Block 618-1 is similar to Block 702 and "proceed to Block 703" should be replaced by "proceed to Block 618-2".

Block 618-2 is similar to Block 703, and "proceed to Block 618" in Block 603 should be replaced by "proceed to Block 618-1".

Furthermore, before Blocks 605 and 609, the method further includes: the H-SLP obtains the information of the third party client, and after determining that the information of the third party client includes information that requires notification and/or verification by the target SET, the H-SLP carries the id of the third party client in an SUPL INIT message. The SUPL END message returned by the target SET to the H-SLP in Block 606 and the SUPL POS INIT message returned by the target SET to the H-SLP in Block 613 carry the id of the third party client granted to be notified. When the V-SPC sends the position estimate of the target SET to the H-SLP in Blocks 615 and 616, the V-SPC sends the id of the third party client granted to be notified. The third party client corresponding to the id is the one to which the H-SLP sends the location notification message.

Furthermore, in Block 607 and/or Block 618, besides the positioning failure parameter and the position estimate of the target SET, the MLP SLIA message sent by the H-SLP to the SUPL Agent may also carry a notification result indicating whether the third party client has received the location of the target SET.

Likewise, Blocks 607-1 and 607-2 may also be performed after Block 607. After Block 607-2, the method may further include Block 607-3: the H-SLP sends the notification result indicating whether the third party client has received the location of the target SET to the SUPL Agent.

Or, Blocks 618-1 and 618-2 may also be performed after Block 618. After Block 618-2, the method may further include Block 618-3: the H-SLP sends the notification result indicating whether the third party client has received the location of the target SET to the SUPL Agent.

Figure 14:
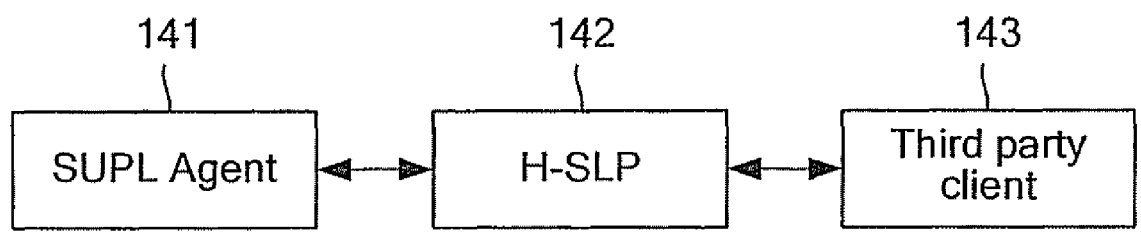
FIG. 14 is a message flow illustrating a system of SUPL according to an embodiment of the present invention.

FIG. 14 is a schematic diagram illustrating a system of SUPL according to an embodiment of the present invention. As shown in FIG. 14, the system mainly includes an SUPL Agent 141, an H-SLP 142 and a third party client 143.

The SUPL Agent 141 is configured to send a positioning request carrying the msid to the H-SLP 142.

Preferably, the SUPL Agent 141 is configured to receive a location notification result sent by H-SLP 142 and forward the location notification result to the target SET.

H-SLP 142 is configured to position the target SET corresponding to the msid contained in a positioning request after receiving the positioning request from the SUPL Agent 141, send a location notification message carrying the position estimate of the target SET to the third party client 143 after obtaining the position estimate of the target SET.

Preferably, H-SLP 142 is configured to receive a location notification response message from the third party client 143, and return a location notification result to the SUPL Agent according to the location notification response message.

Third party client 143 is configured to receive the location notification message carrying the position estimate of the target SET from the H-SLP 142.

Preferably, the third party client 143 is configured to return the location notification response message to the H-SLP 142.

The system further includes: a target SET, configured to receive the notification and verification request message carrying an id of the third party client from the H-SLP 142 and return a notification and verification response message carrying the id of the third party client granted to the H-SLP 142. The H-SLP 142 is further configured to send a location notification message to the third party client 143 identified by the notification and verification response message returned by the target SET.

The system further includes: a PCE, configured to store the information of the third party client and send the information of the third party client stored by the PCE to the H-SLP 142 after receiving a request message for the information of the third party client from the H-SLP 142. The H-SLP 142 sends the location notification message carrying the position estimate of the target SET to the third party client 143 identified by the information of the third party client from the PCE.

The foregoing is only the preferred embodiments of the present invention, and is not for use in limiting the positioning. Any modification, equivalent replacement or improvement made under the spirit and principles of the positioning should be covered within the protection scope of the positioning.

What is claimed is:

1. A method for Secure User Plane Location (SUPL), comprising:
  receiving, by a home SUPL Location Platform (H-SLP) of a target SUPL Enabled Terminal (target SET), a positioning request of the target SET from an SUPL Agent;
  positioning, by the H-SLP, the target SET and obtaining a position estimate of the target SET; and
  sending, by the H-SLP, a location notification message carrying the position estimate of the target SET to a third party client according to information of the third party client, wherein, the method comprises:
  registering, by the target SET and/or a client initiating the positioning request, the information of the third party client when the target SET and/or the client register in the corresponding H-SLP of the target SET and/or the client;
  storing, by the corresponding H-SLP of the target SET and/or the client, the information of the third party client in register information of the target SET and/or the client; and
  obtaining, by the H-SLP, the information of the third party client from the register information of the target SET and/or the client.

2. The method of claim 1, wherein the information of the third party client comprises information that requires notification and/or verification by the target SET, the method further comprising:
  sending, by the H-SLP, to the target SET a notification and/or verification request message carrying id of the third party client;
  receiving, by the H-SLP, a notification and/or verification response message carrying the id of the third party client granted to be notified returned by the target SET; and
  the sending the location notification message to the third party client comprises:

sending, by the H-SLP, the location notification message to the third party client corresponding to the id of the third party client granted to be notified returned by the target SET.

3. The method of claim 2, further comprising:
sending, by the H-SLP, authentication information to the third party client sending the location notification message to the third party client; and
authenticating, by the third party client, the authentication information after receiving the authentication information; if the authentication succeeds, accepting the location notification message; otherwise, rejecting the location notification message.

4. A method for Secure User Plane Location (SUPL), comprising:
receiving, by a home SUPL Location Platform (H-SLP) of a target SUPL Enabled Terminal (target SET), a positioning request of the target SET from an SUPL Agent;
positioning, by the H-SLP, the target SET and obtaining a position estimate of the target SET; and
sending, by the H-SLP, a location notification message carrying the position estimate of the target SET to a third party client according to information of the third party client, wherein, the method comprises:
reporting, by the target SET and/or the client, the information of the third party client to a Privacy Checking Entity (PCE) when the target SET and/or the client register a location service;
storing, by the PCE, the information of the third party client in corresponding privacy information of the target SET and/or the client; and
obtaining, by the H-SLP, privacy information of the target SET and/or the client from the PCE, and obtaining the information of the third party client corresponding to the target SET and/or the client in the privacy information of the target SET and/or the client.

5. A method for Secure User Plane Location (SUPL), comprising:
receiving, by a home SUPL Location Platform (H-SLP) of a target SUPL Enabled Terminal (target SET), a positioning request of the target SET from an SUPL Agent;
positioning, by the H-SLP, the target SET and obtaining a position estimate of the target SET; and
sending, by the H-SLP, a location notification message carrying the position estimate of the target SET to a third party client according to information of the third party client, wherein the positioning request carries the type of a location service; the method further comprising:
storing, by the H-SLP, a corresponding relationship between the type of the location service and the information of the third party client in advance; and
obtaining, by the H-SLP, the information of the third party client from the corresponding relationship based on the type of the location service carried in the positioning request.

6. The method of claim 5, wherein the information of the third party client comprises information that requires notification and/or verification by the target SET, the method further comprising:
sending, by the H-SLP, to the target SET a notification and/or verification request message carrying id of the third party client;
receiving, by the H-SLP, a notification and/or verification response message carrying the id of the third party client granted to be notified returned by the target SET; and
the sending the location notification message to the third party client comprises:
sending, by the H-SLP, the location notification message to the third party client corresponding to the id of the third party client granted to be notified returned by the target SET.

7. The method of claim 6, further comprising:
sending, by the H-SLP, authentication information to the third party client sending the location notification message to the third party client; and
authenticating, by the third party client, the authentication information after receiving the authentication information; if the authentication succeeds, accepting the location notification message; otherwise, rejecting the location notification message.

8. A method for Secure User Plane Location (SUPL), comprising:
receiving, by a home SUPL Location Platform (H-SLP) of a target SUPL Enabled Terminal (target SET), a positioning request of the target SET from an SUPL Agent;
positioning, by the H-SLP, the target SET and obtaining a position estimate of the target SET; and
sending, by the H-SLP, a location notification message carrying the position estimate of the target SET to a third party client according to information of the third party client;
wherein, the method further comprise:
receiving, by the third party client, the location notification message carrying the position estimate of the target SET to the third party client;
if determining that the third party client is not already attached to a Packet Data Network (PDN), attaching, by the third party client, the third party client to the PDN.

9. A method for Secure User Plane Location (SUPL), comprising:
receiving, by a home SUPL Location Platform (H-SLP) of a target SUPL Enabled Terminal (target SET), a positioning request of the target SET from an SUPL Agent;
positioning, by the H-SLP, the target SET and obtaining a position estimate of the target SET; and
sending, by the H-SLP, a location notification message carrying the position estimate of the target SET to a third party client according to information of the third party client, wherein the positioning request carries information that requires a location notification result in response; and the location notification message carries information that requires a location notification response message in response; the method further comprising:
returning, by the H-SLP, the location notification result to the SUPL Agent based on the location notification response message returned by the third party client.

10. A method for Secure User Plane Location (SUPL), comprising:
receiving, by a home SUPL Location Platform (H-SLP) of a target SUPL Enabled Terminal (target SET), a positioning request of the target SET from an SUPL Agent;
positioning, by the H-SLP, the target SET and obtaining a position estimate of the target SET; and
sending, by the H-SLP, a location notification message carrying the position estimate of the target SET to a third party client according to information of the third party client, wherein the positioning request carries a location identifier (lid) of the target SET, and the positioning the target SET comprises:
verifying, by the H-SLP, whether a previously computed position estimate of the target SET stored by the H-SLP meets a requested Quality of Position (QoP); if the previously computed position estimate of the target SET meets the requested QoP, taking the previously computed position estimate of the target SET as the position estimate of the target SET;

if the previously computed position estimate of the target SET does not meet the requested QoP, verifying, by the H-SLP, whether the position estimate of the target SET corresponding to the lid of the target SET meets the requested QoP; if the position estimate of the target SET corresponding to the lid of the target SET meets the requested QoP, taking the position estimate of the target SET corresponding to the lid of the target SET as the position estimate of the target SET;

if the position estimate of the target SET corresponding to the lid of the target SET does not meet the requested QoP, returning, by the H-SLP, an SUPL response message to the target SET; sending, by the target SET, an SUPL Positioning INIT (POS INIT) message carrying posmethod(s) to the H-SLP after receiving the SUPL response message; and determining, by the H-SLP, the posmethod to be adopted based on the posmethod(s) carried in the SUPL POS INIT message after receiving the SUPL POS INIT message, positioning the target SET and obtaining the position estimate of the target SET.

11. A method for Secure User Plane Location (SUPL), comprising:

receiving, by a home SUPL Location Platform (H-SLP) of a target SUPL Enabled Terminal (target SET), a positioning request of the target SET from an SUPL Agent;

positioning, by the H-SLP, the target SET and obtaining a position estimate of the target SET; and sending, by the H-SLP, a location notification message carrying the position estimate of the target SET to a third party client according to information of the third party client, wherein the process of positioning the target SET comprises:

determining, by the H-SLP, a previously computed position estimate of the target SET stored by the H-SLP meets a requested Quality of Position (QoP); taking the previously computed position estimate of the target SET as the position estimate of the target SET, and determining that the first H-SLP should send the position estimate to the target SET for notification and/or verification;

sending, by the H-SLP, an SUPL INIT message carrying a posmethod element with value of "no position" to the target SET; after receiving the SUPL INIT message, verifying, by the target SET, whether the SUPL INIT message contains the posmethod element with value of "no position," if the SUPL INIT message contains the posmethod element with value of "no position," returning, by the target SET, an SUPL END message to the H-SLP;

if the SUPL INIT message does not contain the posmethod element with value of "no position," returning, by the target SET, an SUPL POS INIT message carrying posmethod(s) and lid of the target SET to the H-SLP; after receiving the SUPL POS INIT message, verifying, by the H-SLP, whether the position estimate of the target SET corresponding to the lid of the target SET meets the requested QoP; if the position estimate of the target SET corresponding to the lid of the target SET meets the requested QoP, taking the position estimate of the target SET corresponding to the lid of the target SET as the position estimate of the target SET;

if the position estimate of the target SET corresponding to the lid of the target SET does not meet the requested QoP, determining, by the H-SLP, a posmethod to be adopted according to the posmethod(s) carried in the SUPL POS INIT message, and starting to position the target SET.

12. The method of claim 11, further comprising:

before the H-SLP sends the SUPL INIT message to the target SET, obtaining, by the H-SLP, information of the third party client and determining that the information of the third party client comprises information that requires notification and/or verification by the target SET, the SUPL INIT message carries id of third party client needs notification and/or verification by the target SET, the SUPL END message and the SUPL POS INIT message carry the id of the third party client granted to be notified; wherein, the process of the H-SLP sending the location notification message to the third party client comprises:

sending, by the H-SLP, the location notification message to the third party client corresponding to the id of the third party client granted to be notified carried in the SUPL END message or the SUPL POS INIT message.

* * * * *